US006225916B1

(12) United States Patent
Sugimoto et al.

(10) Patent No.: US 6,225,916 B1
(45) Date of Patent: May 1, 2001

(54) REMOTE CONTROL SIGNAL RECEPTION CONTROLLER

(75) Inventors: Hiroko Sugimoto, Yawata; Tsutomu Sekibe, Neyagawa; Hideyuki Kanzaki, Osaka; Tomohiko Kitamura, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/127,376

(22) Filed: Jul. 31, 1998

(30) Foreign Application Priority Data

Aug. 1, 1997 (JP) ........................................ 9-207541

(51) Int. Cl.7 ........................................ H04Q 7/00

(52) U.S. Cl. ........................ 340/825.69; 340/825.64

(58) Field of Search .................. 340/825.69, 825.06, 340/825.12, 825.11, 825.64

(56) References Cited

U.S. PATENT DOCUMENTS 4,425,628 1/1984 Bedard et al. .
4,698,748 10/1987 Juzswik et al. .
4,860,202 8/1989 Jones .
5,483,231 1/1996 Sasabe .

FOREIGN PATENT DOCUMENTS 507381 10/1992 (EP) .
525667 2/1993 (EP) .
8221174 8/1996 (JP) .

*Primary Examiner*—Edwin C. Holloway, III
(74) *Attorney, Agent, or Firm*—Price and Gess

(57) ABSTRACT

The remote control signal reception controller receives control data transmitted from a remote control signal sender. The remote control signal reception controller informs a CPU that controls a device of the information on the received control data by interrupting the CPU. When doing so, the remote control signal reception controller judges whether a piece of control data that has just been received and a preceding piece of control data were consecutively transmitted, and whether these two pieces of control data are the same control data. The remote control signal reception controller interrupts the CPU only once when finding that the same control data is continuously transmitted as the result of this judgement.

20 Claims, 22 Drawing Sheets

PRIOR ART

PRIOR ART

PRIOR ART

PRIOR ART

FIG. 10

| INPUT | | | OUTPUT |
|---|---|---|---|
| INTERVAL IS EQUAL TO OR SHORTER THAN 200MS | SAME CONTROL DATA ARE RECEIVED | TRAILER DETECTION SIGNAL | |
| 1 | 1 | 1 | 0 |
| 1 | 0 | 1 | 1 |
| 1 | — | 0 | 0 |
| 0 | — | 1 | 1 |
| 0 | — | 0 | 0 |

REMOTE CONTROL SIGNAL RECEPTION CONTROLLER

BACKGROUND OF THE INVENTION (1) Field of the Invention

The present invention relates to a remote control signal reception controller, and especially relates to a remote control signal reception controller that receives remote control signals output from a remote control signal sender and transfers data included in the received signals to a master control device.

(2) Description of the Prior Art

These days a variety of electric appliances that may be controlled by remote control signals are produced and sold.

A remote control signal is explained below.

FIG. 1 shows the format of a remote control signal.

In this specification, a remote control signal refers to a signal output from a remote control signal sender.

A remote control signal includes three parts that are leader part 101, data part 102, and trailer part 103.

Data part 102 includes manufacturer code 104, parity 105, appliance code 106, and data code 107, each of which is represented by a combination of bit data whose values are “0” or “1”. Hereinafter, the data represented by data part 102 will be called “control data”.

The format adopted in FIG. 1 is the format recommended by “Electric Appliance Association (Kaden Seihin Kyokai)” in Japan. In Japan, electric appliance manufacturers may use this format or use an original format. In other countries, electric appliance manufactures use a standardized format.

FIG. 2 shows the timing structures of the signals in leader part 101, data part 102, and trailer part 103.

A conventional remote control signal reception controller that receives a remote control signal, the format of which is described above, is explained with reference to FIGS. 3 and 4.

FIG. 3 shows the construction of a conventional remote control signal reception controller.

A remote control signal reception system includes remote control signal reception controller 2500 and CPU 2517.

Remote control signal reception controller 2500 includes edge detection unit 2501, edge interval measurement counter 2502, remote control signal identification unit 2503, received data shift register 2507, data reception counter 2508, received data storage unit 2515, and interrupt control unit 2516. Edge detection unit 2501 detects that the level of an input signal changes between low and high. Edge interval measurement counter 2502 measures the intervals between the edges detected by edge detection unit 2501. Remote control signal identification unit 2503 identifies the leader that represents the beginning of a remote control signal in the adopted format, the trailer that represents the end of the remote control signal, and the bit data values “0” and “1” in the data part, from the values measured by edge interval measurement counter 2502 when edge detection unit 2501 detects an edge. Received data shift register 2507 shifts and stores the bit data whose value has been identified as “0” or “1” by remote control signal identification unit 2503. Data reception counter 2508 counts the number of bits of the bit data that received data shift register 2507 stores. Received data storage unit 2515 stores the data transferred from received data shift register 2507 and outputs data when accessed by from CPU 2517. Interrupt control unit 2516 generates an interrupt signal for CPU 2517.

Remote control signal identification unit 2503 includes leader detection unit 2504 for detecting a leader, data judgement unit 2505 for judging the value of bit data as “0” or “1”, and trailer detection unit 2506 for detecting a trailer.

CPU 2517 is the master control device that obtains received data from remote control signal reception controller 2500 and controls devices to which the remote control signal reception system is connected and the components in the devices.

FIG. 4 is a flowchart showing the procedure for processing a remote control code that a conventional remote control signal reception controller receives.

A remote control code refers to the parts of a remote control signal from the leader part to the trailer part.

Data reception counter 2508 and edge interval measurement counter 2502 are initialized to “0” (Step S2601). Remote control signal reception controller 2500 waits for a signal to be input from a remote control signal sender (Step S2602).

Edge interval measurement counter 2502 continues to increment the counter value until edge detection unit 2501 detects an edge of an input signal (Step S2603).

When edge detection unit 2501 detects an edge, edge interval measurement counter 2502 outputs the counter values to remote control signal identification unit 2503 (Step S2604). Then edge interval measurement counter 2502 is initialized (Step S2605).

Remote control signal identification unit 2503 selects the next process according to the input counter values (Step S2606).

When the counter values show that a leader is detected, remote control signal identification unit 2503 informs interrupt control unit 2516 of the leader detection, and interrupt control unit 2516 interrupts CPU 2517 in order to inform CPU 2517 of the leader detection (Step S2607). Remote control signal identification unit 2503 waits for the next edge to be detected (Step S2602).

When the counter values show bit data whose value is “0” or “1” is detected (Step S2606), data judgement unit 2505 judges whether the value is “0” or “1”. Remote control signal identification unit 2503 transfers the received bit data to received data shift register 2507 (Step S2608), and has data reception counter 2508 start to incrementing the counter value (Step S2609).

When the value of data reception counter 2508 reaches “n”, that is, the capacity of received data shift register 2507 (Step S2610), data reception counter 2508 transfers the bit data stored in received data shift register 2507 to received data storage unit 2515 (Step S2611). Data reception counter 2508 is initialized to “0” (Step S2612). Data reception counter 2508 informs interrupt control unit 2516 that “n” bits of bit data have been received, and interrupt control unit 2516 interrupts CPU 2517 in order to inform CPU 2517 that “n” bits of bit data is received (Step S2613). Remote control signal identification unit 2503 waits for the next edge to be detected (Step S2602).

When the value of data reception counter 2508 does not reach “n” (Step S2610), no operations at Steps S2611 to 2613 is performed. Remote control signal identification unit 2503 waits for the next edge to be detected (Step S2602).

When the counter values input into remote control signal identification unit 2503 show that a trailer is detected (Step S2606), remote control signal identification unit 2503 informs interrupt control unit 2516 of the trailer detection, and interrupt control unit 2516 interrupts CPU 2517 in order to inform CPU 2517 of the trailer detection (Step S2614).

When interrupted and informed of the reception of "n" bits of bit data, CPU 2517 obtains the "n" bits of received bit data from received data storage unit 2515, and stores the obtained data in a memory connected to CPU 2517.

CPU 2517 regards the process from a leader detection interrupt to a trailer detection interrupt as the reception of one piece of remote control signal data. In other words, CPU 2517 controls devices to which the remote control signal reception system is connected and the components in the devices according to the value of the control data, that is, the received bit data stored in the memory.

A leader detection interrupt, a trailer detection interrupt, and an "n" bits of bit data reception interrupt are all necessary for CPU 2517 to obtain control data.

As described above, a conventional remote control signal reception controller transfers all of the received bit data to the CPU.

Generally speaking, when the user presses a remote control signal sender button, the remote control signal sender transmits the same remote control signal code repeatedly. Even when receiving the same remote control signal code repeatedly, a conventional remote control signal reception controller repeatedly interrupts the CPU to request the CPU to read the same received data.

As a result, a conventional remote control signal reception controller requires the CPU to acknowledge the interrupt and to read the same received bit data repeatedly, so that the load on the CPU unnecessarily increases.

The CPU controls devices to which the remote control signal reception system is connected and the components in the devices. As a result, the increased load on the CPU delays the operation of the devices.

In a digital device, for instance, in a digital broadcast receiver, the components are controlled by the CPU, so that an increased load on the CPU has an especially pronounced effect in lowering the performance of the device.

SUMMARY OF THE INVENTION

It is accordingly the object of the present invention is to solve the problem that has been described. In other words, the object is to provide a remote control signal reception controller that reduces the load on the CPU.

The above-mentioned object is achieved by a remote control signal reception controller that receives control data for controlling operation of an electric appliance transmitted from a remote control signal sender and notifies a CPU which controls the operation of the electric appliance of information on the received control data may include: a reception unit for receiving control data; an interval measurement unit for measuring, when the reception unit receives a second piece of control data following a first piece of control data, an interval between reception of the first and second piece of control data; a notification unit for notifying the CPU of the information on the received control data by interrupting; and a notification control unit for having the notification unit notify the CPU of information on the second piece of control data when the interval measured by the interval measurement unit is larger than a first value that represents an interval between transmissions of a same piece of control data which is repeatedly transmitted from the remote control signal sender, and for preventing the notification unit from notifying the CPU of the information on the second piece of control data when the interval measured by the interval measurement unit is equal to or smaller than the first value.

According to the construction described above, when remote control signal sender repeatedly transmits the same remote control signal corresponding to the user's operation of the remote control signal sender, the remote control signal reception controller receives the remote control signal repeatedly, while informing the CPU of the reception of the-remote control signal only once.

When the user presses the same remote control signal sender button for a long time, the remote control signal sender continuously transmits the same control data. Only when the interval between the reception of control data and the previously received control data is longer than a first predetermined value, the CPU is informed of the control data.

As a result, the repeating times of notification to the CPU is limited to the minimum, that is, the CPU is not unnecessarily interrupted, so that the load on the CPU may be reduced.

The above-mentioned object is also achieved by the remote control signal reception controller which may further include an identity judgement unit for judging whether the first and second piece of control data are a same piece of control data when the reception unit receives the second piece of control data following the first piece of control data, wherein when the identity judgement unit judges that the first and second piece of control data are different, the notification control unit does not prevent a notification of the information on the second piece of control data.

According to the construction described above, when the user continuously presses the different remote control signal sender buttons in a short period, and when the remote control signal sender continuously transmits the different remote control signals, the remote control signal reception controller according to the present invention informs the CPU of control data every time receiving a different remote control signal. As a result, the CPU may control the operation of the device connected to the remote control signal reception system according to the user's operation.

The above-mentioned object is also achieved by the remote control signal reception controller which may further include continuous notification necessity information storage unit for storing information in advance, the information showing whether the CPU needs to be informed of information on a piece of control data every time a piece of control data is received, wherein when finding that the CPU needs to be notified of information on the second piece of control data on referring to the information stored in the continuous notification necessity information storage unit, the notification control unit does not prevent the notification of the information on the second piece of control data.

According to the construction described above, when the user presses, for instance, a remote control signal sender button that instructs a TV (television) set to raise the volume for a long time, the remote control signal reception controller judges that the CPU should be informed of the control data corresponding to the pressed button, and informs the CPU of the control data corresponding to the pressed button. As a result, the CPU may raise the volume of the TV set gradually.

The above-mentioned object is also achieved by the remote control signal reception controller, wherein the CPU receives a command, and controls the operation of the electric appliance based on the received command; the notification unit includes a command information storage unit for storing information in advance, the information in which a piece of control data is related to a command; and the notification unit refers to the information stored in the command information storage unit, and notifies the CPU of a command related to a piece of control data as the information on the piece of control data.

According to the construction described above, the CPU receives not the control data included in a remote control signal as it is, but the command in the form that is easy for the CPU to deal with and is suitable for the internal processing. As a result, it is unnecessary for the CPU to change the form of received control data, so that the load on the CPU is reduced.

The above-mentioned object is also achieved by the remote control signal reception controller, wherein the notification unit combines information on a piece of control data of which the notification control unit has the notification unit notify the CPU and information on at least one preceding piece of control data of which the notification control unit has had the notification unit notify the CPU but of which the notification unit has not yet notified the CPU, and the notification unit notifies the CPU of the combined information by interrupting the CPU once.

According to the construction described above, when the user presses a remote control signal sender button after pressing one button, one piece of information is created for the pressed button(s) and is output to the CPU. In other words, one press of a remote control signal sender button after the press of one button may represent one piece of new information. For instance, when the user presses remote control signal sender buttons "1" and "2", the CPU may be informed of the information representing "12". The CPU may perform the control that is specified only by pressing a remote control signal sender button after pressing one button.

As a result, the number of the kinds of the control instruction of which the CPU is informed by the remote control signal reception controller may be larger than the number of the buttons on the remote control signal sender, and the load on the CPU may be reduced to the minimum.

The above-mentioned object is also achieved by the remote control signal reception controller, wherein the notification unit notifies the CPU of information on a piece of control data of which the notification control unit has the notification unit notify the CPU within a predetermined period of time of receiving a notification instruction from the notification control unit.

According to the construction described above, when the user presses a remote control signal sender button after pressing one button with a relatively short interval, the remote control signal reception controller informs the CPU of one piece of information. When the user presses a remote control signal sender button after pressing one button with a relatively long interval, the remote control signal reception controller informs the CPU of two independent pieces of information corresponding to the two presses. As a result, the user may instruct the CPU to perform different controls according to the length of the interval between these two presses.

For instance, when the user presses the remote control signal sender buttons "1" and "2" with a relatively long interval, the CPU deals with two pieces of information corresponding to the buttons "1" and "2" independently.

The above-mentioned object is also achieved by the remote control signal reception controller may further include a number detection unit for detecting that a number of times a same piece of control data is received is equal to a second value, wherein when the number detection unit detects that the number of times a same piece of control data has been received is equal to the second value, the notification control unit does not prevent the notification of the information on the second piece of control data.

According to the construction described above, when the remote control signal reception controller continuously receives the same control data, the CPU is informed of the control data that the remote control signal reception controller receives predetermined numbers of times. As a result the load on the CPU may be reduced.

For instance, when the predetermined numbers are set at "1" "4", "7", and "10", and when the same control data is continuously transmitted, the CPU may be informed of the received control data every three times the remote control signal reception controller receives the same control data. For instance, when the user presses the remote control signal sender button that represents the instruction to raise the volume of a TV set for a long time, the remote control signal reception controller may inform the CPU of the information corresponding to the button every predetermined period of time. As a result, the CPU may raise the volume of the TV set gradually.

The above-mentioned object is also achieved by the remote control signal reception controller may further include: a received data storage unit for storing control data; a previously received data storage unit for storing as control data; and a previously received data transfer unit for transferring control data from the received data storage unit to the previously received data storage unit, wherein the reception unit stores the received control data in the received data storage unit, the identity judgement unit compares a second piece of control data that is stored in the received data storage unit with a first piece of control data that is stored in the previously received data storage unit, and judges whether the first and second piece of control data are a same piece of control data, the previously received data transfer unit transfers a piece of control data from the received data storage unit to the previously received data storage unit after a judgement by the identity judgement unit, the interval measurement unit includes: an elapsed time counter for counting elapsed time and storing a counted value; and a counter reset unit for resetting the elapsed time counter after the notification control unit refers to the counted value stored in the elapsed time counter as the interval between the reception of the first. and second piece of control data, and the notification unit includes: an output data storage unit for storing CPU-readable control data that the CPU is notified of; an interrupt control unit for interrupting the CPU in order to request the CPU to read control data; an output transfer unit for transferring control data from the received data storage unit to the output data storage unit; and an output control unit for giving a transfer instruction to the output transfer unit and instructing the interrupt control unit to interrupt the CPU when receiving an instruction from the notification control unit to notify the CPU of control data.

According to the construction described above, the remote control signal reception controller judges whether control data that corresponds to a remote control signal sender button pressed once by the user is continuously transmitted, or control data is intermittently transmitted according to the user's more than one operations using the counter that counts the intervals between the receptions of remote control data. The remote control signal reception controller also judges whether the just received control data and the previously received control data are the same by storing the received control data in a memory element. As a result, the remote control signal reception controller may limit the repeating times that the CPU is informed of control data to the minimum based on these judgement, so that the remote control signal reception controller may reduce the load on the CPU with the simple construction.

The above-mentioned object is also achieved by the remote control signal reception controller, wherein the notification unit may further include: a CPU notification information storage unit for storing information in advance, the information showing control data of which the CPU should be informed; a peripheral device access information conversion unit for converting, when finding that the CPU should not be informed of a piece of control data stored in the output data storage unit on referring to the information stored in the CPU notification information storage unit, the piece of control data stored in the output data storage unit into an address corresponding to a peripheral device connected to the remote control signal reception controller and an input data for the peripheral device; and a peripheral device control unit for obtaining an address and an input data using the peripheral device access information conversion unit and controlling a peripheral device, and herein when finding that the CPU should be notified of the second piece of control data the information of which the notification control unit has the notification unit notify the CPU on referring to the CPU notification information storage unit, the output control unit instructs the interrupt control unit to inform the CPU of the piece of control data, and when finding that the CPU should not be notified of the second piece of control data, the output control unit has the peripheral device control unit control a peripheral device.

According to the construction described above, the remote control signal reception controller according to the present invention may directly control the peripheral device, so that the remote control signal reception controller may control the peripheral device without unnecessarily increasing the load on the CPU.

In order to achieve the above described object, the remote control signal reception controller according to the present invention is a remote control signal reception controller that receives control data for controlling operation of an electric appliance transmitted from a remote control signal sender and notifies a CPU which controls the operation of the electric appliance of information on the received control data may include: a reception unit for receiving control data; an interval measurement unit for measuring, when the reception unit receives a second piece of control data following a first piece of control data, an interval between reception of the first and second piece of control data; a notification. unit for notifying the CPU of the information on the received control data by interrupting; and a notification control unit for having, only when the interval measured by the interval measurement unit is larger than a first value that represents an interval between transmissions of a same piece of control data which is repeatedly transmitted from the remote control signal sender, the notification unit notify the CPU of information on the second piece of control data, wherein the notification unit includes: a combined command information storage unit for storing information in advance, the information in which a command is related to two pieces of control data that may be combined; an output data storage unit for storing a CPU-readable command that the CPU is notified of; an interrupt control unit for interrupting the CPU in order to request the CPU to read a command; and an output control unit for judging whether it is possible to combine information on a piece of control data of which the notification control unit has the notification unit notify the CPU and information on at least one preceding piece of control data of which the notification control unit has had the notification unit notify the CPU but of which the notification unit has not yet notified the CPU on referring to the information stored in the combined command information storage unit, for storing a command corresponding to a set of the information on the piece of control data and the information on the at least one piece of control data in the output data storage unit, and for instructing the interrupt control unit to interrupt the CPU when combining is possible.

According to the construction described above, when the user presses a remote control signal sender button after pressing one button, the remote control signal reception controller creates one piece of information, and informs the CPU of the created information, so that two presses may represent one new instruction. As a result, the load on the CPU is reduced, when compared with the method in which the CPU is informed of two pieces of information corresponding to these two presses and combines these two pieces of information to perform the control corresponding to the combined information.

The above-mentioned object is also achieved by the remote control signal reception controller, wherein the notification unit may further include a command information storage unit for storing information in advance, the information in which a piece of control data is related to a command, and the output control unit stores commands corresponding to control data of which the notification control unit has the notification unit notify the CPU in the output data storage unit within a predetermined period of time of receiving a notification instruction from the notification control unit on referring to the information stored in the command information storage unit, and instructs the interrupt control unit to interrupt the CPU.

According to the construction described above, when the user presses a remote control signal sender button after pressing a button with a relatively short interval, the CPU is informed of one piece of information. When the user presses a remote control signal sender button after pressing a button with a relatively long interval, the CPU is informed of two independent pieces of information. As a result, the user may instruct the CPU to perform different controls according to the length of the interval. of these two presses.

In order to achieve the above described object, the remote control signal reception controller according to the present invention is a remote control signal reception controller that receives control data for controlling operation of an electric appliance transmitted from a remote control signal sender and notifies a CPU which controls the operation of the electric appliance of information on the received control data may include: a reception unit for receiving control data; an identity judgement unit for judging whether the first and second piece of control data are a same piece of control data when the reception unit receives the second piece of control data following the first piece of control data; a notification unit for notifying the CPU of the information on the received control data by interrupting; and a notification control unit for having the notification unit notify the CPU of information on the second piece of control data when the identity judgement unit judges that the first and second piece of control data are different, and for preventing the notification unit from notifying the CPU of the information on the second piece of control data when the identity judgement unit judges that the first and second piece of control data are the same piece of control data.

According to the construction described above, only when the just received control data and the previously received control data are different, the CPU is informed of the just received data. As a result, when the same control data is continuously transmitted from the remote control signal sender, the CPU is not informed of every piece of control data, so that the load on the CPU may be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 10 is the state transition table of notification control unit 8005;

DESCRIPTION OF THE PREFERRED EMBODIMENTS

The preferred embodiments of the present invention are explained with reference to figures.

(First Embodiment)

Figure 1:
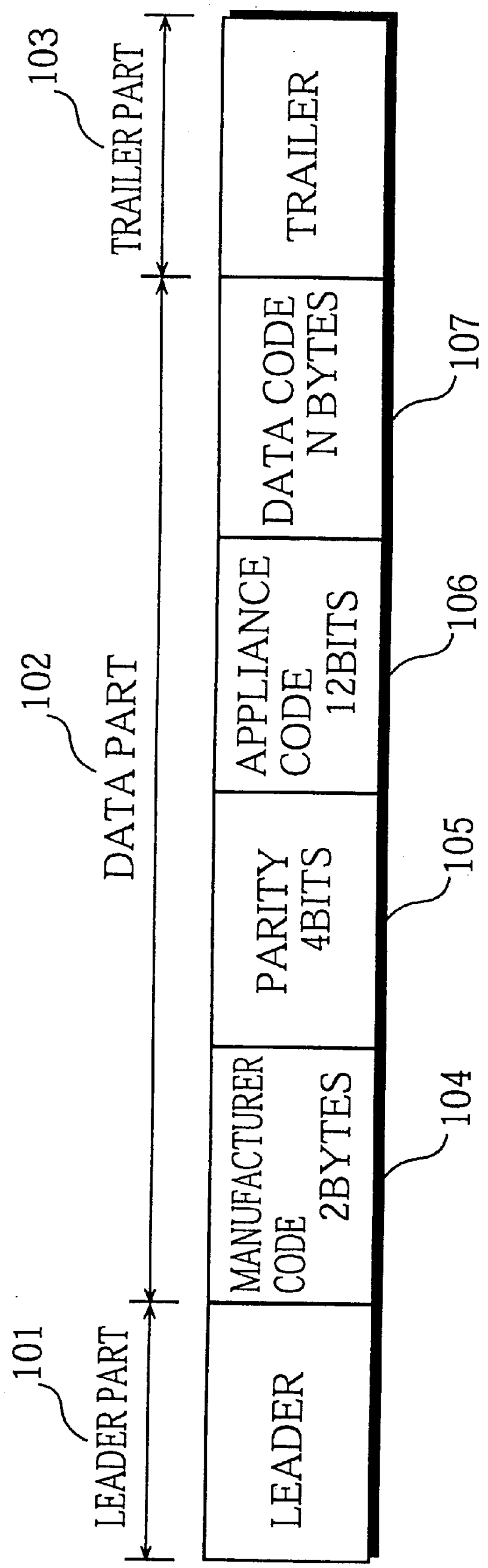
FIG. 1 shows the format of a remote control signal.
Figure 2:
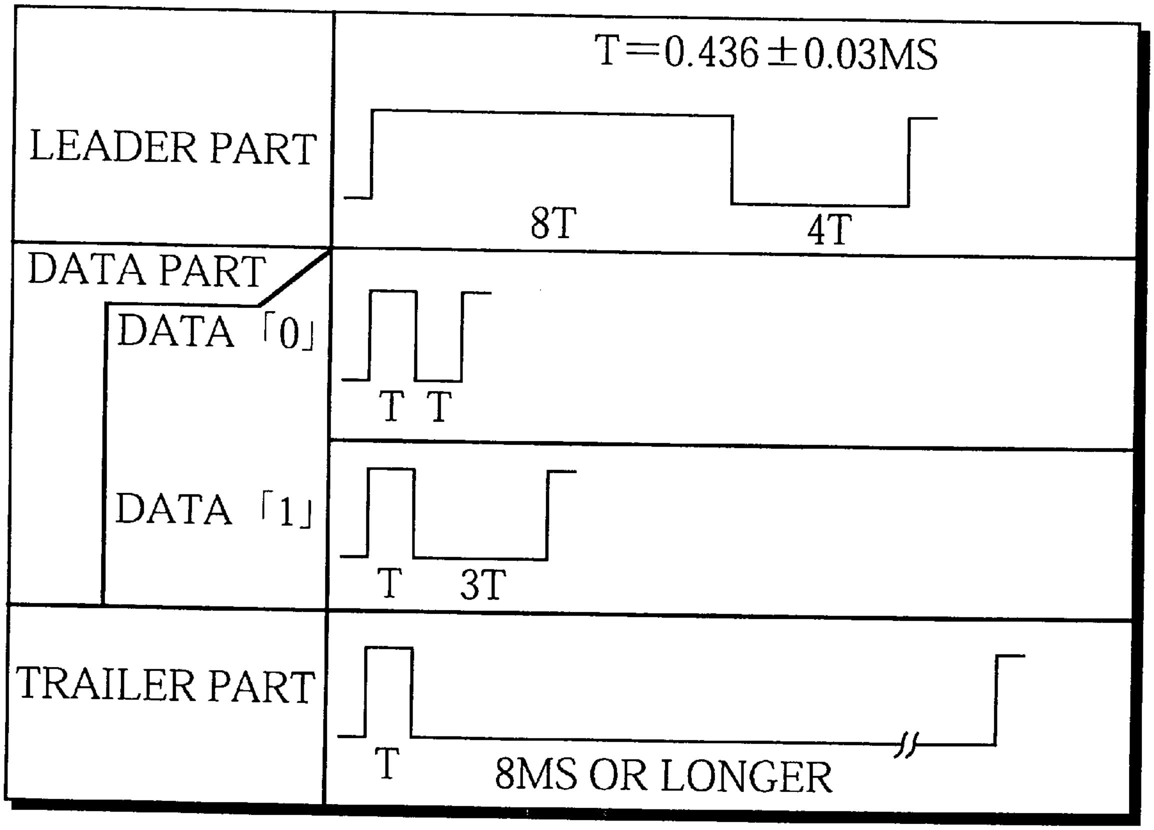
FIG. 2 shows the timing structures of the signals in leader part 101, data part 102, and trailer part 103.
Figure 3:
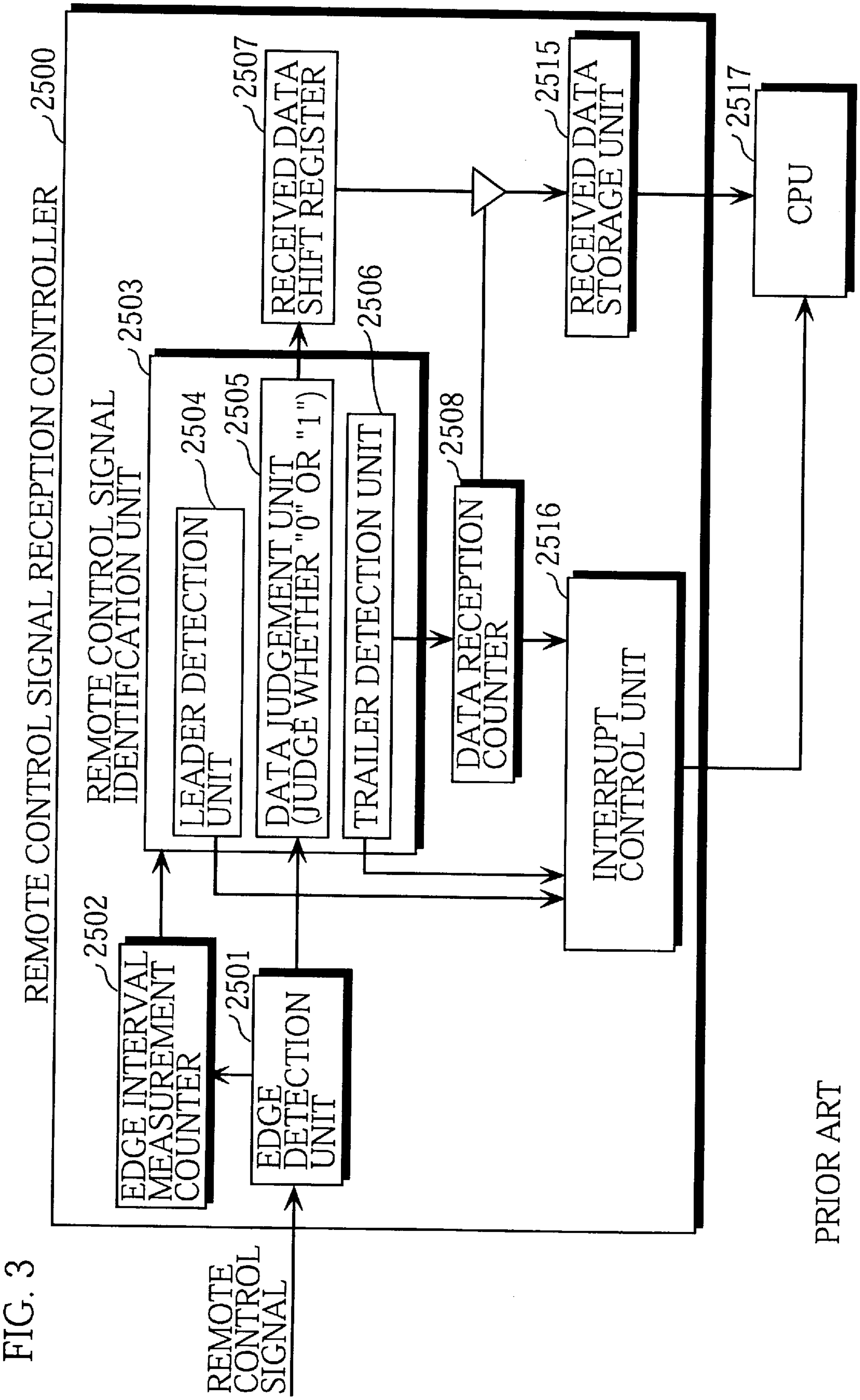
FIG. 3 shows the construction of a conventional remote control signal reception controller.
Figure 4:
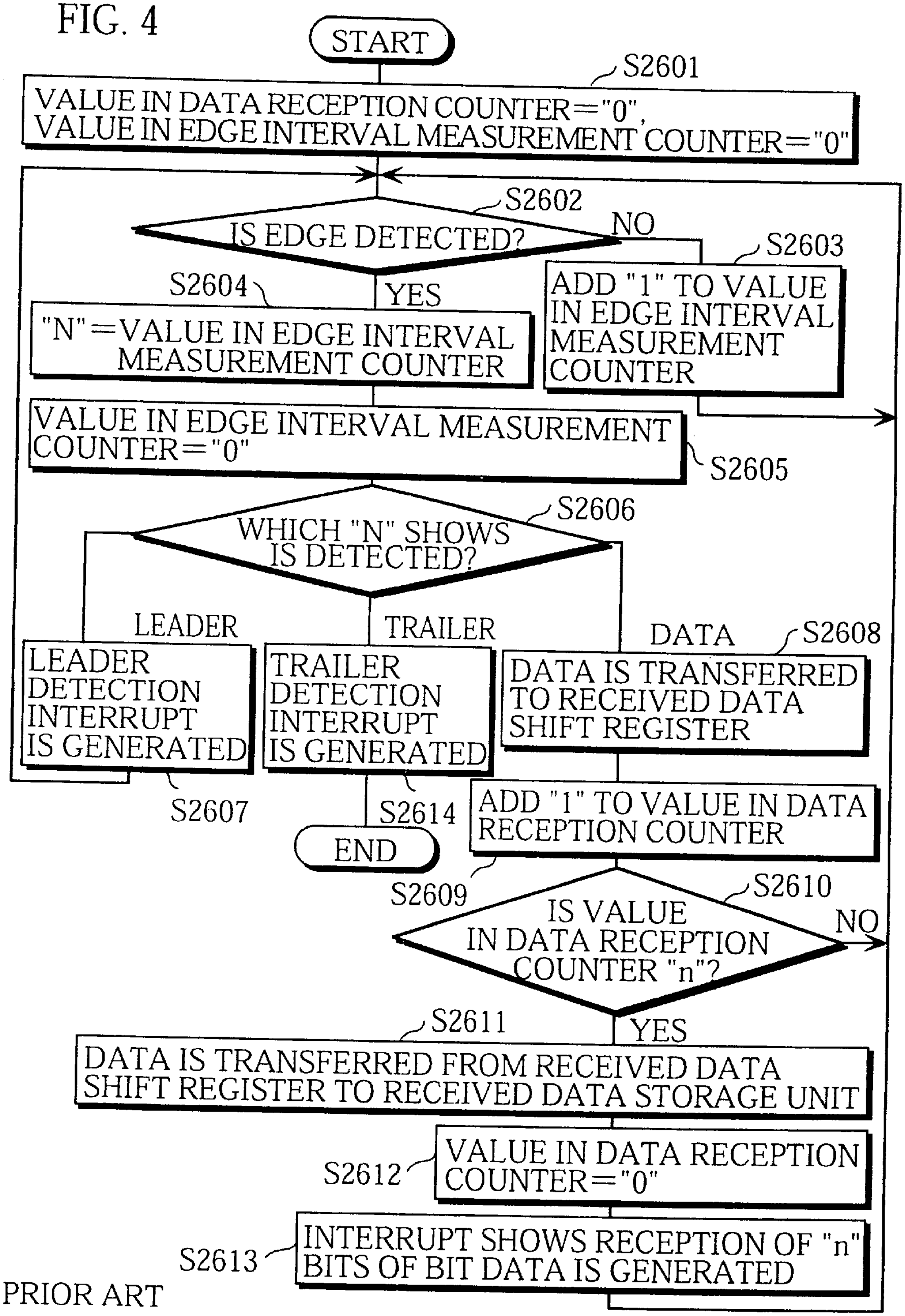
FIG. 4 is a flowchart showing the procedure for processing a remote control code that a conventional remote control signal reception controller receives.

A remote control signal reception controller according to the present invention is explained in the first embodiment, as one example, where the remote control signal reception controller receives a remote control signal that has the same format as in the explanation of the conventional art (refer to FIGS. 1 and 2).

In the first embodiment, the size of data code 107 is 2 bytes, so that the size of the control data is 6 bytes.

Figure 5:
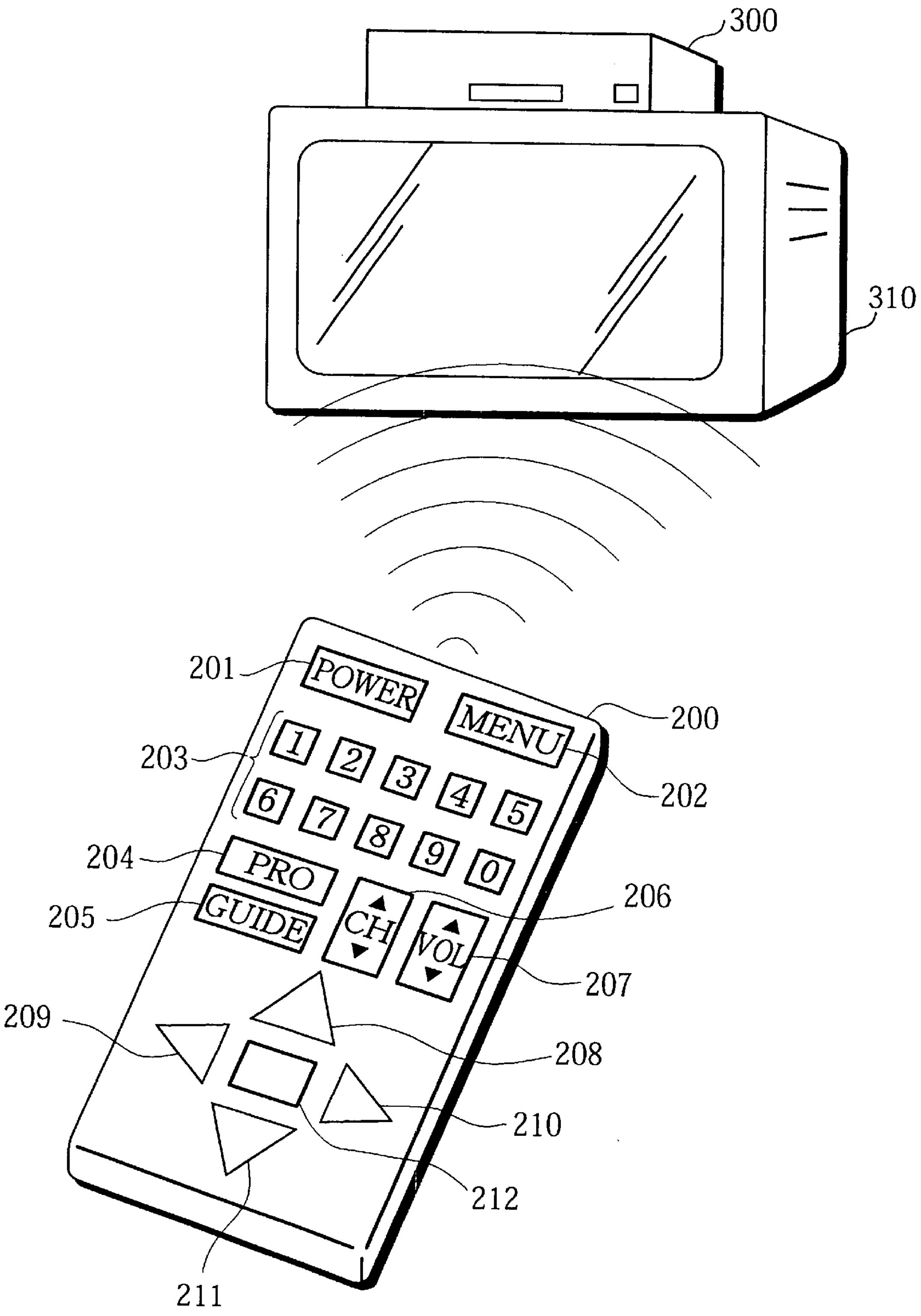
FIG. 5 shows an example of the construction of a digital broadcast reception system equipped with the remote control signal reception controller in the first embodiment.

FIG. 5 shows a construction of a digital broadcast reception system equipped with the remote control signal reception controller in the first embodiment.

The digital broadcast reception system in FIG. 5 includes remote control signal sender 200, digital broadcast reception terminal 300 (otherwise known as "IRD: Integrated Receiver Decoder") for receiving digital broadcasts, for instance, CS broadcasts, and TV (television) monitor 310.

Remote control signal sender 200 is a standard remote controller including a variety of buttons for controlling digital broadcast reception terminal 300. Remote control signal sender 200 includes power button 201, menu display button 202, numerical figure buttons 203, promotion channel display button 204 for displaying advertisements and promotions of broadcasting stations, operation guide display button 205, channel switch button 206 for switching channels in numerical order, volume control button 207, and cursor buttons 208 to 211 and determination button 212 for selecting menus.

When the user watching a digital broadcasting program presses a button on remote control signal sender 200 to switch from one channel to another in order to watch another program, a remote control signal is transmitted.

Digital broadcast reception terminal 300 includes a remote control signal reception and a CPU, receives remote control signals from remote control signal sender 200, and functions in order to receive digital broadcasts under the control of the CPU. Hereinafter the remote control signal reception controller and the CPU are called a "remote control signal reception system".

For instance, when the user presses menu display button 202 on remote control signal sender 200, digital broadcast reception terminal 300 displays a menu screen that is a graphical user interface for selecting functions on TV monitor 310. The user controls cursor buttons 208 to 211 and determination button 212 on remote control signal sender 200 and selects a function on the menu screen.

Figure 6:
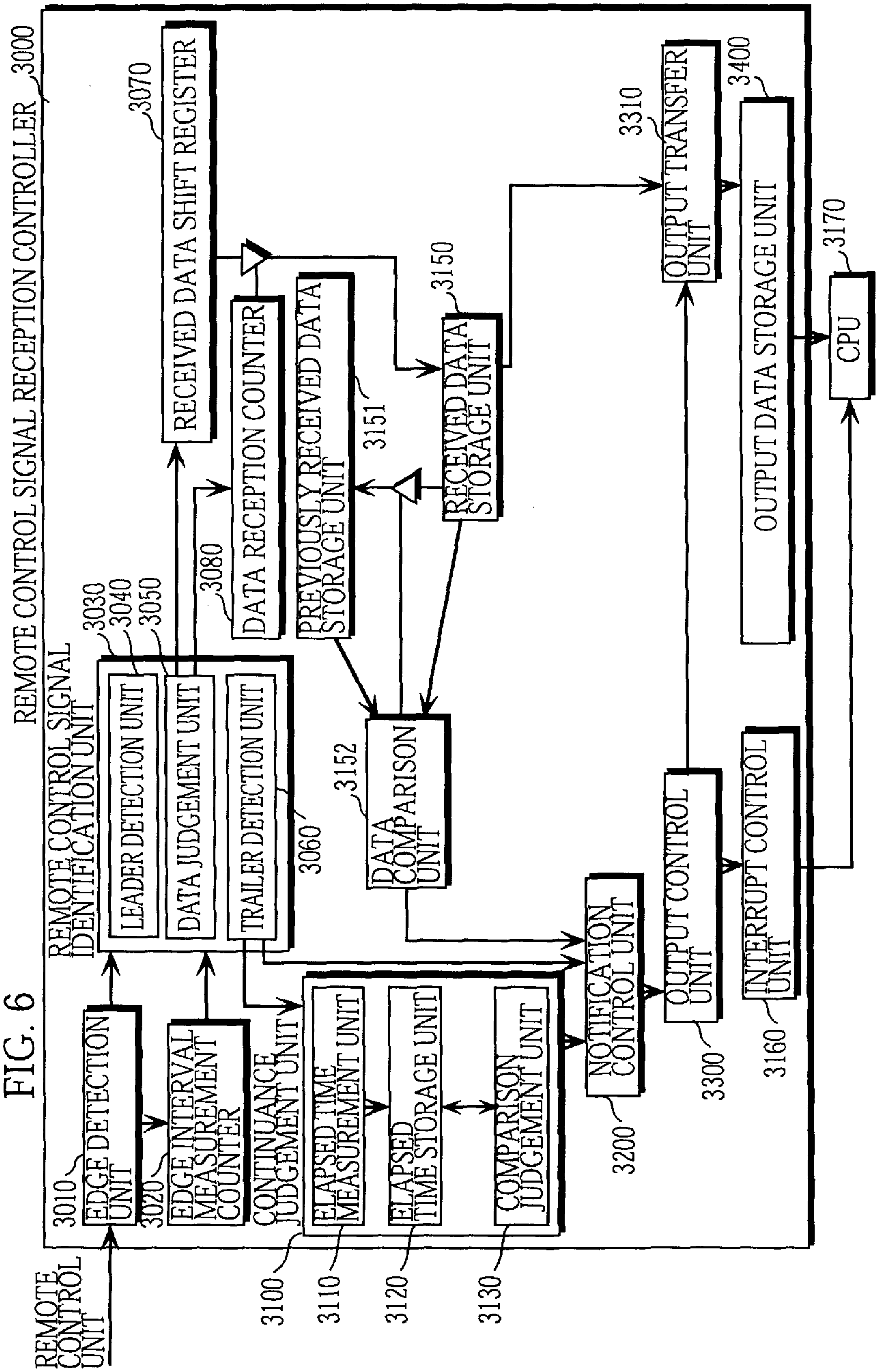
FIG. 6 shows a construction of the remote control signal reception controller in the first embodiment.

FIG. 6 shows a construction of the remote control signal reception controller in the first embodiment.

Remote control signal reception system includes remote control signal reception controller 3000 and CPU 3170. This remote control signal reception system is part of digital broadcast reception terminal 300. CPU 3170 controls a variety of functions on receiving digital broadcasts.

Remote control signal reception controller 3000 includes edge detection unit 3010, edge interval measurement counter 3020, remote control signal identification unit 3030, received data shift register 3070, data reception counter 3080, continuance judgement unit 3100, received data storage unit 3150, previously received data storage unit 3151, data comparison unit 3152, output data storage unit 3400 for storing data to be transferred to CPU 3170, interrupt control unit 3160 for interrupting CPU 3170 in order to request CPU 3170 to read data, output transfer unit 3310, output control unit 3300, and notification control unit 3200.

Edge detection unit 3010 detects that the level of an input signal changes between low and high. Edge interval measurement counter 3020 measures the interval between the edges detected by edge detection unit 3010. Remote control signal identification unit 3030 identifies the leader that represents the beginning of a remote control signal in the format, the trailer that represents the end of the remote control signal, and the bit data values "0" and "1" in the data part, from the values measured by edge interval measurement counter 3020 every time edge detection unit 3010 detects an edge.

Remote control signal identification unit 3030 includes leader detection unit 3040, data judgement unit 3050, and trailer detection unit 3060. Leader detection unit 3040 detects a leader. Data judgement unit 3050 judges the value of a received signal as "0" or "1", transfers the data as bit data to received data shift register 3070, and has data reception counter 3080 count. Trailer detection unit 3060 detects a trailer, and informs continuance judgement unit 3100 and notification control unit 3200 of the detection.

Received data shift register 3070 shifts and stores the bit data whose value has been identified as "0" or "1" by remote control signal identification unit 3030. Data reception counter 3080 counts the number of bits of the bit data that received data shift register 3070 stores.

Continuance judgement unit 3100 judges whether the interval between received control data and the previously received control data is longer than a predetermined interval based on the trailer detection by remote control signal identification unit 3030. Continuance judgement unit 3100 includes elapsed time storage unit 3120 for storing the elapsed time, elapsed time measurement unit 3110 for increasing the value stored in elapsed time storage unit 3120 as the time proceeds, and comparison judgement unit 3130 for comparing the value of the elapsed time stored in elapsed time storage unit 3120 with the value of the predetermined interval. In the present embodiment, the predetermined interval represents 200 milliseconds.

Received data storage unit 3150 stores data transferred from received data shift register 3070. Previously received data storage unit 3151 stores data transferred from received data storage unit 3150. Data comparison unit 3152 compares the data stored in received data storage unit 3150 and previously received data storage unit 3151.

Output transfer unit 3310 transfers the data stored in received data storage unit 3150 to output data storage unit 3400. Output control unit 3300 instructs output transfer unit 3310 to transfer data and has interrupt control unit 3160 generate an interrupt. Notification control unit 3200 is informed of the detection of a trailer by remote control signal identification unit 3030, and instructs output control unit 3300 to output data on referring to continuance judgement unit 3100.

When informed of the trailer detection by remote control signal identification unit 3030, notification control unit 3200 refers to continuance judgement unit 3100. When the elapsed time is equal to or shorter than the predetermined interval, or 200 milliseconds, notification control unit 3200 stops output control unit 3300 outputting data. When the elapsed time is longer than the predetermined interval, notification control unit 3200 has output control unit 3300 output data. When data comparison unit 3152, however, finds that the control data stored in received data storage unit 3150 and that in previously received data storage unit 3151 are different, notification control unit 3200 has output control unit 3300 output data.

The capacity of each of received data storage unit 3150 and previously received data storage unit 3151 is 6 bytes, that is, the size of the control data.

Output data storage unit is a memory that is accessed according to FIFO (first-in first-out) order, and has a capacity of 60 bytes.

Received data storage unit 3150 stores the bit datetransferred from received data shift register 3070. In other words, control data is accumulated in received data storage unit 3150.

The operations performed by the remote control signal reception controller in the first embodiment, the construction of which has been described, are explained below with reference to FIG. 7.

Figure 7:
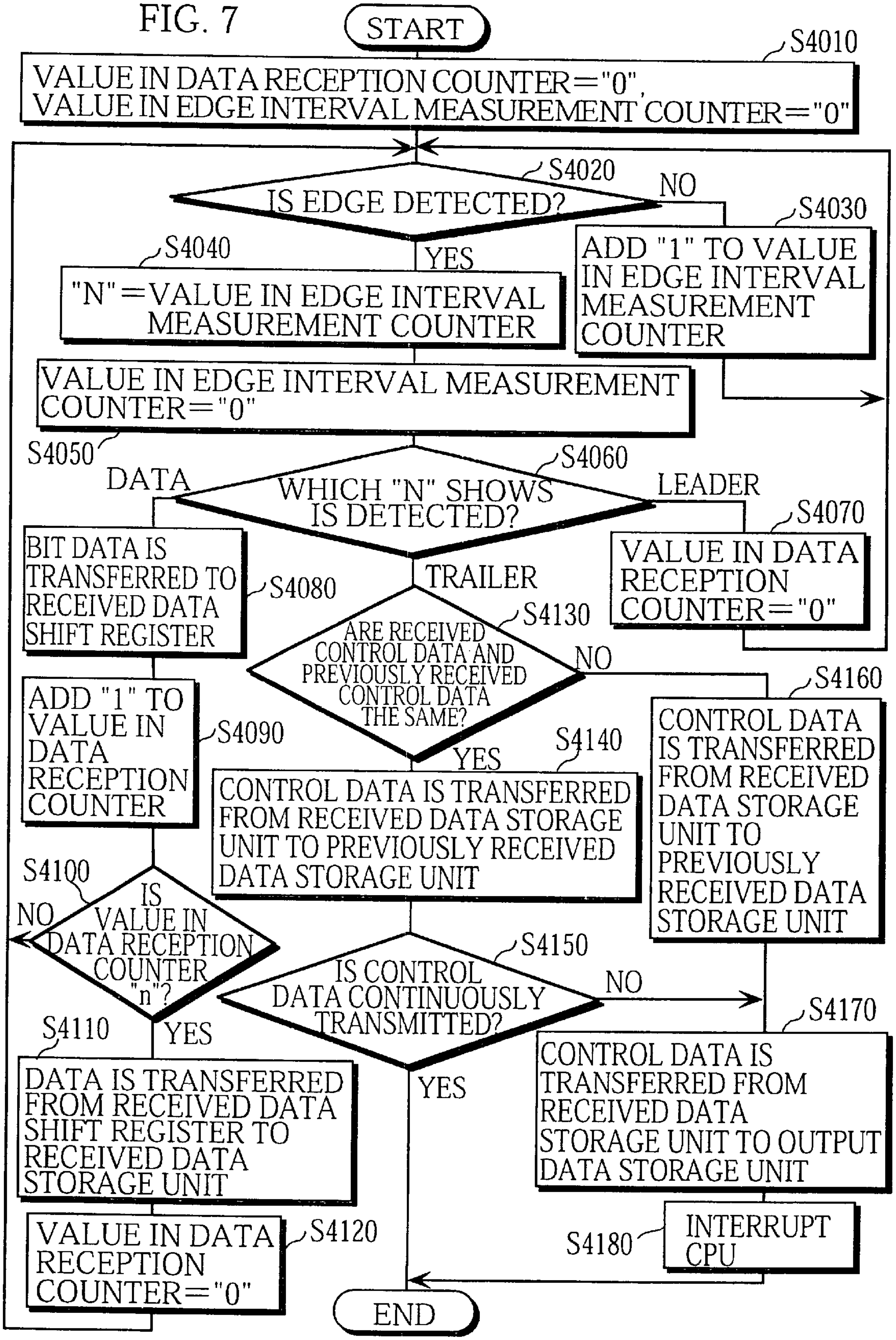
FIG. 7 is a flowchart showing the operation by the remote control signal reception controller in the first embodiment.

FIG. 7 is a flowchart showing the operations performed by the remote control signal reception controller in the first embodiment.

Data reception counter 3080 and edge interval measurement counter 3020 are initialized to "0" (Step S4010). Remote control signal reception controller 3000 waits for a signal to be input from a remote control signal sender (Step S4020).

Edge interval measurement counter 3020 continues to increment its counter value until edge detection unit 3010 detects an edge of an input signal (Step S4030).

When edge detection-unit 3010 detects an edge, edge interval measurement counter 3020 outputs the counter values to remote control signal identification unit 3030 (Step S4040). Then edge interval measurement counter 3020 is initialized (Step S4050).

Remote control signal identification unit 3030 selects the next process according to the input counter values (Step S4060).

A remote control signal is a repeated series of a leader, data, and a trailer. The next process is Step S4070, S4080, or S4130 depending on the present part of the remote control signal.

When the counter values show that a leader is detected, leader detection unit 3040 initializes the value of data reception counter 3080 (Step S4070). The process proceeds to the next edge detection (Step S4020).

When the counter values show that bit data whose value is "0" or "1" is detected (Step S4060), data judgement unit 3050 judges whether the value is "0" or "1", and transfers the received bit data to received data shift register 3070 (Step S4080). Data reception counter 3080 starts incrementing its value (Step S4090).

When the value of data reception counter 3080 reaches "n", that is, the capacity of received data shift register 3070 (Step S4100), data reception counter 3080 transfers the bit data stored in received data shift register 3070 to received data storage unit 3150 (Step S4110). Data reception counter 3080 is initialized to "0" (Step S4120).

When the value of data reception counter 3080 does not reach "n" (Step S4100), no operations at Steps S4110 and S4120 is performed. The process returns to Step S4020 at which the next edge detection is awaited.

As a result, control data is detected by remote control signal identification unit 3030 as data whose value is "0" or "1". This data is stored in received data storage unit 3150 via received data shift register 3070.

When the counter values of edge interval measurement counter 3020 that have been input into remote control signal identification unit 3030 show that a trailer has been detected (Step S4060), trailer detection unit 3060 informs continuance judgement unit 3100 and notification control unit 3200 of the-trailer detection. The process proceeds to the judgement at Step S4130.

Notification control unit 3200 judges the result of the comparison between the data in received data storage unit 3150 and that in previously received data storage unit 3151 by data comparison unit 3152, and controls output control unit 3300 (Step S4130). As a result of the comparison by data comparison unit 3152, when the data stored in received data storage unit 3150 and that in previously received data storage unit 3151 are different, the process proceeds to Step S4160. When the data are the same, the process proceeds to Step S4140.

In received data storage unit 3150, the control data that has just been received is stored, while in previously received data storage unit 3151, the data that was received just before the data in received data storage unit 3150 is stored. When remote control signal reception controller 3000 is activated, the value of the contents in previously received data storage unit 3151 is all "0".

When the data that has just been received and the data that was previously received are different, CPU 3170 has to be informed of the newly received data.

After comparing the data, data comparison unit 3152 transfers the control data stored in received data storage unit 3150 to previously received data storage unit 3151 (Steps S4140 and S4160).

As a result of the comparison, when the compared data are the same, notification control unit 3200 finds whether the just received control data is part of continuously transmitted data by referring to the judgement by continuance judgement unit 3100 (Step S4150).

Notification control unit 3200 judges whether the just received control data is part of continuously transmitted data or part of intermittently transmitted data using the information from trailer detection unit 3060. The judgement standard is the interval between the reception of two trailers. When the interval between the reception is equal to or shorter than 200 milliseconds, the control data including these trailers are judged to have been continuously transmitted. When the interval is longer than 200 milliseconds, the control data are judged to be intermittently transmitted.

When control data is continuously transmitted, it is sufficient to inform CPU 3170 of the transmission only of the firstly transmitted control data. When control data is intermittently transmitted, however, it is necessary to inform CPU 3170 of the transmission of all pieces of the transmitted control data, since these control data may be transmitted from the remote control signal sender when the user intermittently presses the button more than once.

When finding that the control data is part of intermittently transmitted data (Step S4150), notification control unit 3200 controls output control unit 3300, and has output transfer unit 3310 transfer the control data from received data storage unit 3150 to output data storage unit 3400 (Step S4170). Notification control unit 3200 has interrupt control unit 3160 interrupt CPU 3170 (Step S4180). The processing of a signal from the leader to the trailer is completed at Step S4180.

When notification control unit 3200 finds that the control data is part of continuously transmitted data (Step S4150), the processing of a signal is completed.

A remote control signal is repeatedly transmitted. In other words, a set of a leader part, data part, and a trailer part is repeatedly transmitted, so that the process shown in the flowchart in FIG. 7 is performed repeatedly.

Figure 8:
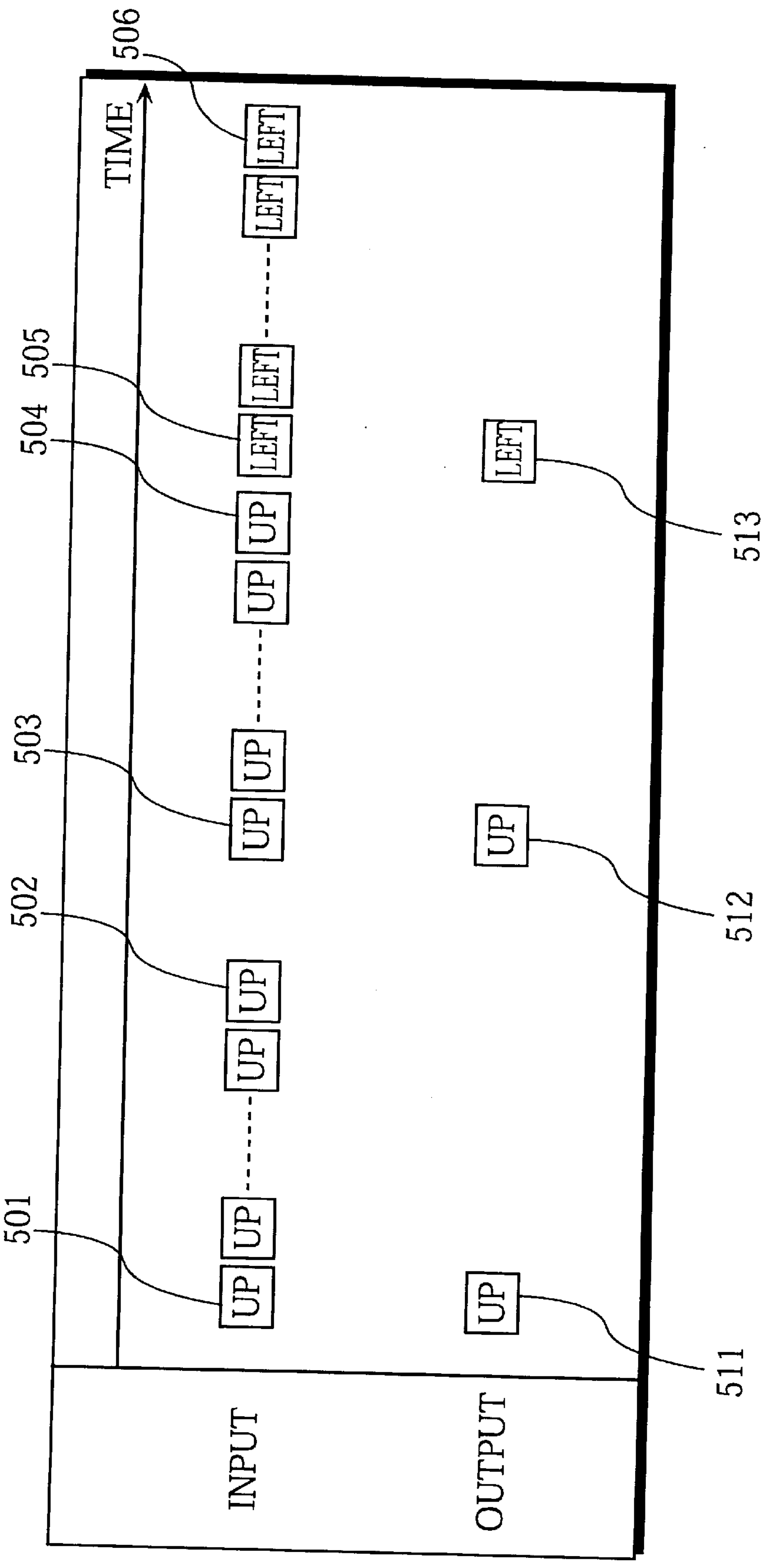
FIG. 8 shows examples of control data that are input into and output from remote control signal reception controller 3000.

FIG. 8 shows examples of the control data that are input into and output from remote control signal reception controller 3000.

The input control data represents control data that remote control signal reception controller 3000 receives, while the output control data represents control data that remote control signal reception controller 3000 instructs CPU 3170 to read by interrupting CPU 3170.

In FIG. 8, one box represents one piece of control data. More specifically, a box "UP" represents a piece of control data that is input into remote control signal reception controller 3000 when the user presses cursor button 208. A box "LEFT" represents a piece of control data when the user presses cursor button 209 (refer to FIG. 5).

FIG. 8 shows that as a result of continuous transmission of remote control signals from remote control signal sender 200, "UP" control data 501 to 502 are continuously input into remote control signal reception controller 3000, while one piece of "UP" control data 511 is output from remote control signal reception controller 3000. "UP" control data 503 to 504 are continuously input into remote control signal reception controller 3000, while one piece of "UP" control data 512 is output from remote control signal reception controller 3000. "LEFT" control data 505 to 506 are continuously input into remote control signal reception controller 3000, while one piece of "LEFT" control data 513 is output from remote control signal reception controller 3000.

A remote control signal reception controller according to the present invention transfers received control data to the CPU after excluding the repetition of the received control data.

(More Specific Embodiment)

A more specific embodiment of the elements that center around continuance judgement unit 3100 in remote control signal reception controller 3000 in the above-described first embodiment is explained below.

Figure 9:
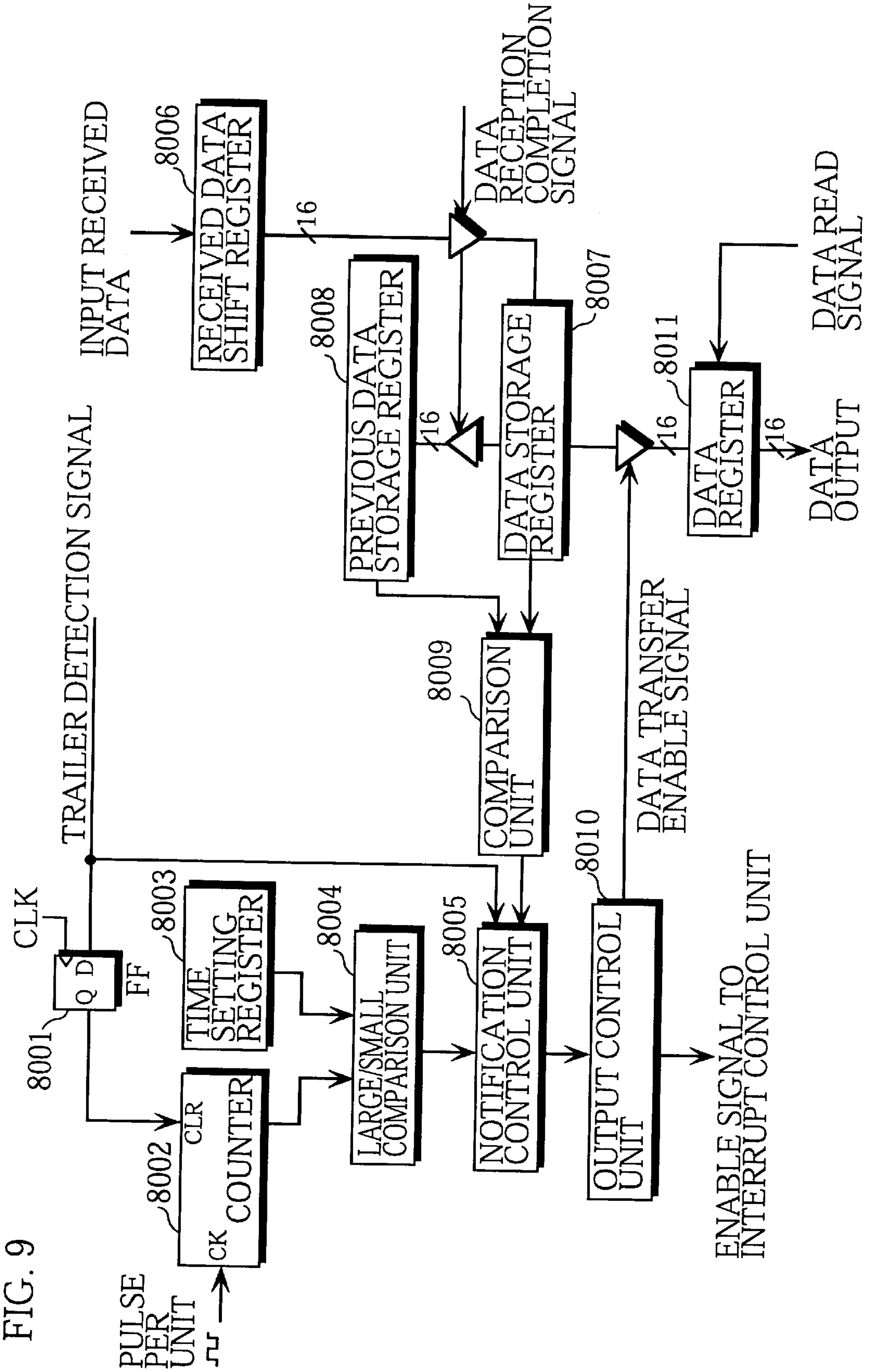
FIG. 9 is a hardware block diagram that shows an embodiment of a part centered on continuance judgement unit 3100 in remote control signal reception controller 3000.

FIG. 9 is a hardware block diagram that shows an embodiment of the elements centered on continuance judgement unit 3100 in remote control signal reception controller 3000.

In the present embodiment, the elements that correspond to continuance judgement unit 3100 in the first embodiment are flip-flop 8001, counter 8002, time setting register 8003, and large/small comparison unit 8004. Flip-flop 8001 stores a trailer detection signal output from the element corresponding to trailer detection unit 3060. Counter 8002 counts the number of pulses per unit time, the pulses being generated in remote control signal reception controller 3000. Time setting register 8003 stores the value of the unit time corresponding to 200 milliseconds. Large/small comparison unit 8004 compares the number that counter 8002 counts with the value stored in time setting register 8003.

After a trailer detection signal is input into flip-flop 8001, counter 8002 is cleared by an output signal from flip-flop 8001. In other words, counter 8002 is cleared after a trailer detection signal is generated.

As a result, counter 8002 may execute the function that measures the intervals between trailer detection signals.

In the present embodiment, a remote control signal reception controller receives a remote control signal in which the size of data unit 102 is 2 bytes (16 bits) and the length of trailer unit 103 is T+74.62 milliseconds. The value of "T" is 0.436±0.03 millisecond as shown in FIG. 2, so that an interval between trailer detection signals is between 121.82 and 164.62 milliseconds when remote control signals are continuously transmitted. As a result, when the interval between two trailer detection signals is longer than 200 milliseconds, the remote control signal reception controller in the present embodiment judges that the user presses a remote control signal sender button intentionally twice.

Received data shift register 8006 in the remote control signal reception controller in the present embodiment corresponds to received data shift register 3070 in the first embodiment, and has the capacity of 16 bits. Received data is input to received data shift register 8006 from the element corresponding to data judgement unit 3050 in the first embodiment. The element corresponding to data judgement unit 3050 in the first embodiment extracts only 16-bit data code 107 from data unit 102 (refer to FIG. 1) as received data, and inputs the received data into received data shift register 8006.

Data storage register 8007 in the remote control signal reception controller in the present embodiment corresponds to received data storage unit 3150 in the first embodiment, and has a capacity of 16 bits. Previous data storage register 8008 in the remote control signal reception controller in the present embodiment corresponds to previously received data storage unit 3151, and has a capacity of 16 bits.

Comparison unit 8009 is the comparator that compares the control data stored in previous data storage register 8008 and data storage register 8007.

In the present embodiment, data is transferred from received data shift register 8006 to data storage register 8007 and from data storage register 8007 to previous data storage register 8008 under the circumstance described below. The circumstance is when a data reception completion signal that shows the completion of the received data input is given from the element corresponding to data judgement unit 3050 in the first embodiment.

Notification control unit 8005 is a logic circuit. On receiving the signal output from large/small comparison unit 8004 showing the result of large/small comparison, the signal output from comparison unit 8009 showing whether the control data are the same, and a trailer detection signal, notification control unit 8005 outputs the signal showing whether an enable signal should be output.

When receiving an output signal from notification control unit 8005, output control unit 8010 outputs an enable signal to the interrupt control unit, and outputs a data transfer enable signal. When a data transfer enable signal is output, data is transferred from data storage register 8007 to data register 8011. On receiving a data read signal from the CPU, data register 8011 corresponding to output data storage unit 3400 in the first embodiment outputs the data to the CPU.

FIG. 10 is the state transition table of notification control unit 8005.

The state transition table in FIG. 10 shows the logical specification on which notification control unit 8005 that is a logical circuit outputs a signal. In FIG. 10, a "1" represents "yes" or "to receive the signal", while a "0" represents "no" or "not to receive the signal".

For instance, when the interval between trailer detection signals is equal to or shorter than 200 milliseconds, and the just received data and the previously received data are the same, notification control unit 8005 outputs no signal even when receiving a trailer detection signal.

Notification control unit 8005 outputs a signal to output control unit 8010 under the circumstances described below. The first circumstance is when the interval between trailer detection signals is equal to or shorter than 200 milliseconds, the received data and the previously received data are different, and notification control unit 8005 receives a trailer detection signal. The second condition is when the interval between trailer detection signals is longer than 200 milliseconds, and notification control unit 8005 receives a trailer detection signal.

When detecting a trailer, the remote control signal reception controller in the present embodiment does not always interrupt the CPU in order to output data to the CPU. As a result, the load on the CPU may be reduced.

(Second Embodiment)

A remote control signal reception controller according to the present invention is explained in the second embodiment, as one example, where the remote control signal reception controller receives a remote control signal that has the same format as in the explanation of the conventional art (refer to FIGS. 1 and 2).

Figure 11:
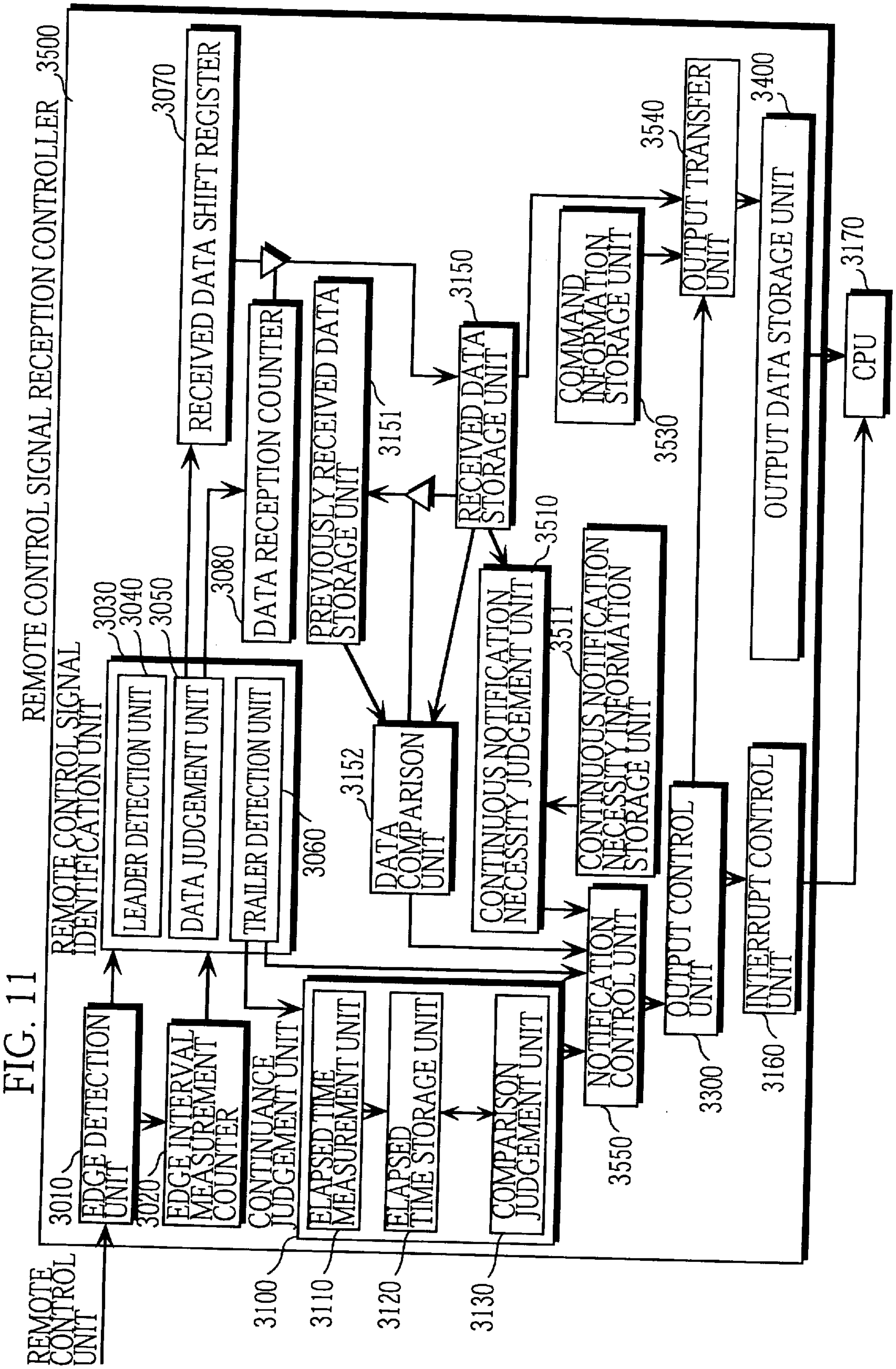
FIG. 11 shows a construction of the remote control signal reception controller in the second embodiment.

FIG. 11 shows a construction of the remote control signal reception controller in the second embodiment.

In FIG. 11, the same reference numbers are given to the same elements in remote control signal reception controller 3000 in the first embodiment.

The same elements as in the first embodiment are explained briefly.

The remote control signal reception system includes remote control signal reception controller 3500 and CPU 3170. The remote control signal reception system is part of a digital broadcast reception terminal. CPU 3170 controls a variety of functions on receiving digital broadcasts.

Remote control signal reception controller 3500 includes edge detection unit 3010, edge interval measurement counter 3020, remote control signal identification unit 3030, received data shift register 3070, data reception counter 3080, continuance judgement unit 3100, received data storage unit 3150, previously received data storage unit 3151, data comparison unit 3152, output data storage unit 3400, interrupt control unit 3160, command information storage unit 3530, output transfer unit 3540, continuous notification necessity information storage unit 3511, continuous notification necessity judgement unit 3510, output control unit 3300, and notification control unit 3550. Command information storage unit 3530 stores the information in which control data and commands are related. Output transfer unit 3540 refers to command information storage unit 3530 and the control data stored in received data storage unit 3150, and transfers the command that is related to the control data in command information storage unit 3530 to output data storage unit 3400. Continuous notification necessity information storage unit 3511 stores the information on the control data of which CPU 3170 should be continuously informed. Continuous notification necessity judgement unit 3510 refers to continuous notification necessity information storage unit 3511 and judges whether it is necessary to continuously inform CPU 3170 of the control data stored in received data storage unit 3150. Output control unit 3300 gives output transfer unit 3540 a transfer instruction, and has interrupt control unit 3160 interrupt CPU 3170. Notification control unit 3550 receives trailer detection notification from remote control signal identification unit 3030, and gives output control unit 3300 an output instruction on referring to continuance judgement unit 3100, data comparison unit 3152, and continuous notification necessity judgement unit 3510.

Remote control signal reception controller 3500 in the second embodiment differs from remote control signal reception controller 3000 in including continuous notification necessity judgement unit 3510, continuous notification information storage unit 3511, and command information storage unit 3530, and in the functions of output transfer unit 3540, and notification control unit 3550.

Continuous notification necessary information storage unit 3511 stores each piece of control data of which CPU 3170 should be continuously informed. For instance, when the user watching a digital broadcasting program continues to press a remote control signal sender button to raise the volume of TV monitor 310, the volume should be gradually increased, so that all of the control data in the remote control signals transmitted from the remote control signal sender needs to be transferred to CPU 3170.

More specifically, the control data that represents volume increase is stored-in continuous notification necessity information storage unit 3511. When receiving the control data that represents volume increase, continuous notification necessity judgement unit 3510 informs notification control unit 3550 that the CPU should be continuously informed of the control data.

When receiving control data of which continuous notification necessity judgement unit 3510 judges that CPU 3170 should be continuously informed, notification control unit 3550 instructs output control unit 3300 to output the control data without stopping. When receiving other control data of which continuous notification necessity judgement unit 3510 judges that CPU 3170 should not be continuously informed, notification control unit 3550 judges whether the received control data should be output without stopping in the same manner as notification control unit 3200.

Command information storage unit 3530 stores a table in which control data and commands are related. A command is a piece of data of a predetermined size and format, and is used by CPU 3170 for the internal processing.

For instance, when control data is 6 bytes of data "101033015020h", the command is 2 bytes of data, "1020h". The command corresponding to a piece of data is determined in advance, and is stored in command information storage unit 3530.

The operations in which notification control unit 3550 receives a trailer detection notification from remote control signal identification unit 3030, controls output control unit 3300, and interrupts CPU 3170 are explained below with reference to FIG. 12.

Figure 12:
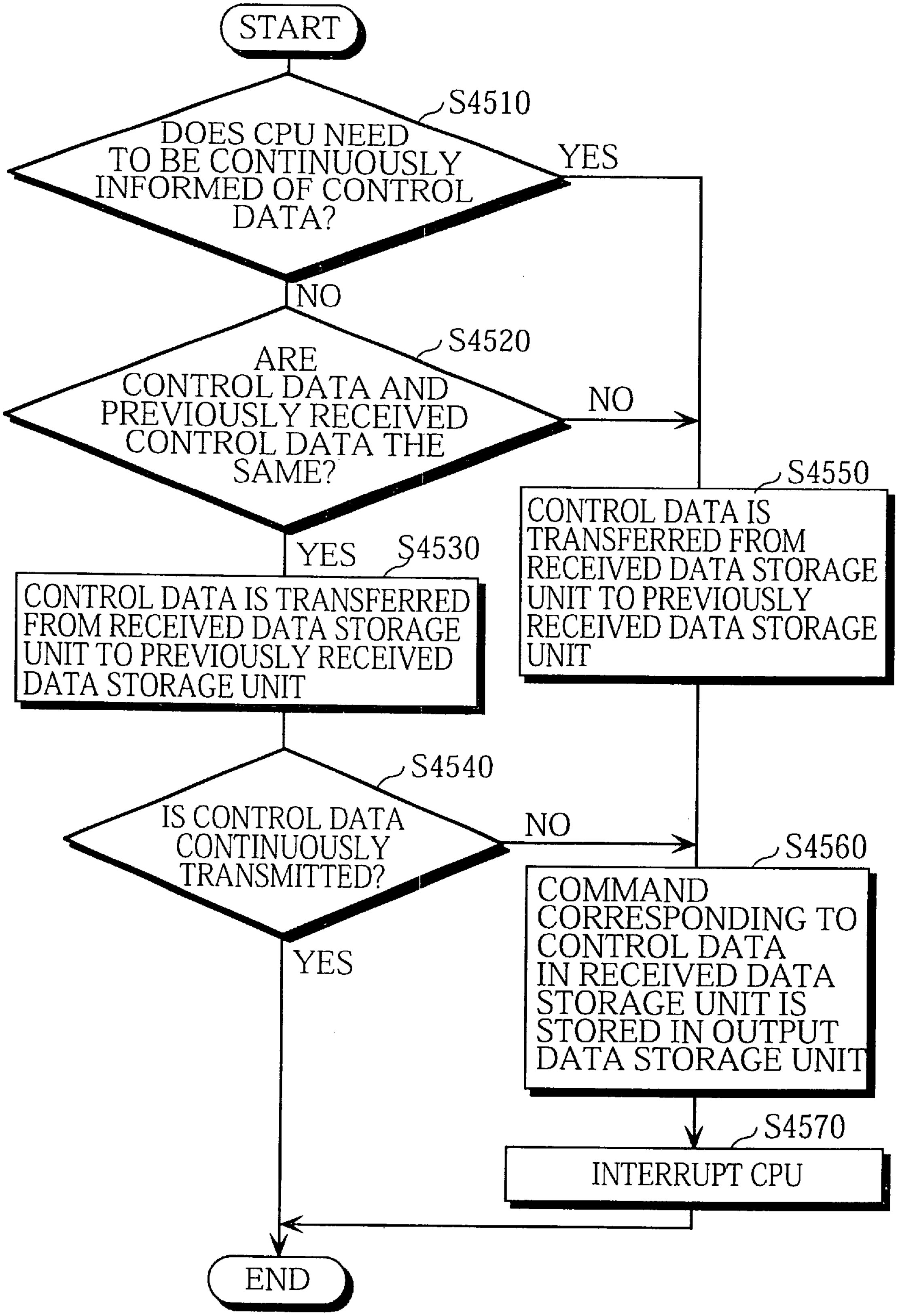
FIG. 12 is a flowchart showing the operation by the remote control signal reception controller in the second embodiment after a trailer detection.

FIG. 12 is a flowchart showing operations performed by the remote control signal reception controller in the second embodiment after detecting a trailer.

The flowchart in FIG. 12 shows only the steps corresponding to Steps S4130, S4150, S4160, S4170, and S4180 in the flowchart in FIG. 7 that are the operations performed by remote control signal reception controller 3000 in the first embodiment.

When receiving a trailer detection notification from remote control signal identification unit 3030, notification control unit 3550 judges whether CPU 3170 should be continuously informed of the control data (Step S4510). At Step S4510, notification control unit 3550 judges on referring to the judgement by continuous notification necessity judgement unit 3510 that judges whether the control data stored in received data storage unit 3150 is included in the information stored in continuous notification necessity information storage unit 3511.

When notification control unit 3550 judges that CPU 3170 should be informed of the control data, the control data is transferred from received data storage unit 3150 to previously received data storage unit 3151 (Step S4550).

When notification control unit 3550 judges that CPU 3170 does not need to be informed of the control data (Step S4510), notification control unit 3550 judges the result of the comparison by data comparison unit 3152 between the control data stored in received data storage unit 3150 and the control data stored in previously received data storage unit 3151, and controls output control unit 3300 (Step S4520). More specifically, when the control data stored in received data storage unit 3150 and previously received data storage unit 3151 are different, the process proceeds to Step S4550. When the control data are the same, the process proceeds to Step S4530. The operation at Step S4520 is the same as at Step S4130 in the first embodiment.

The operations at Steps S4530 and S4550 are the same as at Steps S4140 and S4160, respectively. At Step S4530 or S4550, the control data stored in received data storage unit 3150 is transferred to previously received data storage unit 3151.

After Step S4530, notification control unit 3550 controls output control unit 3300 based on the result of the judgement by continuance judgement unit 3100 whether the control data is continuously transmitted (Step S4540). When continuance judgement unit 3100 judges that the control data should be continuously transmitted; the process in which a trailer detection notification is received is completed at Step S4540.

When continuance judgement unit 3100 judges that the control data should be intermittently transmitted (Step S4540), and when the operation at Step S4550 is completed, notification control unit 3550 has output control unit 3300 control output transfer unit 3540. Notification control unit 3550 has output transfer unit 3540 obtain the command corresponding to the control data stored in received data storage unit 3150 from command information storage unit 3530, and has output transfer unit 3540 store the obtained command in output data storage unit 3400 (Step S4560). Notification control unit 3550 has CPU 3170 be interrupted (Step S4570).

The process in which a trailer detection notification is received is completed at Step S4570.

Figure 13:
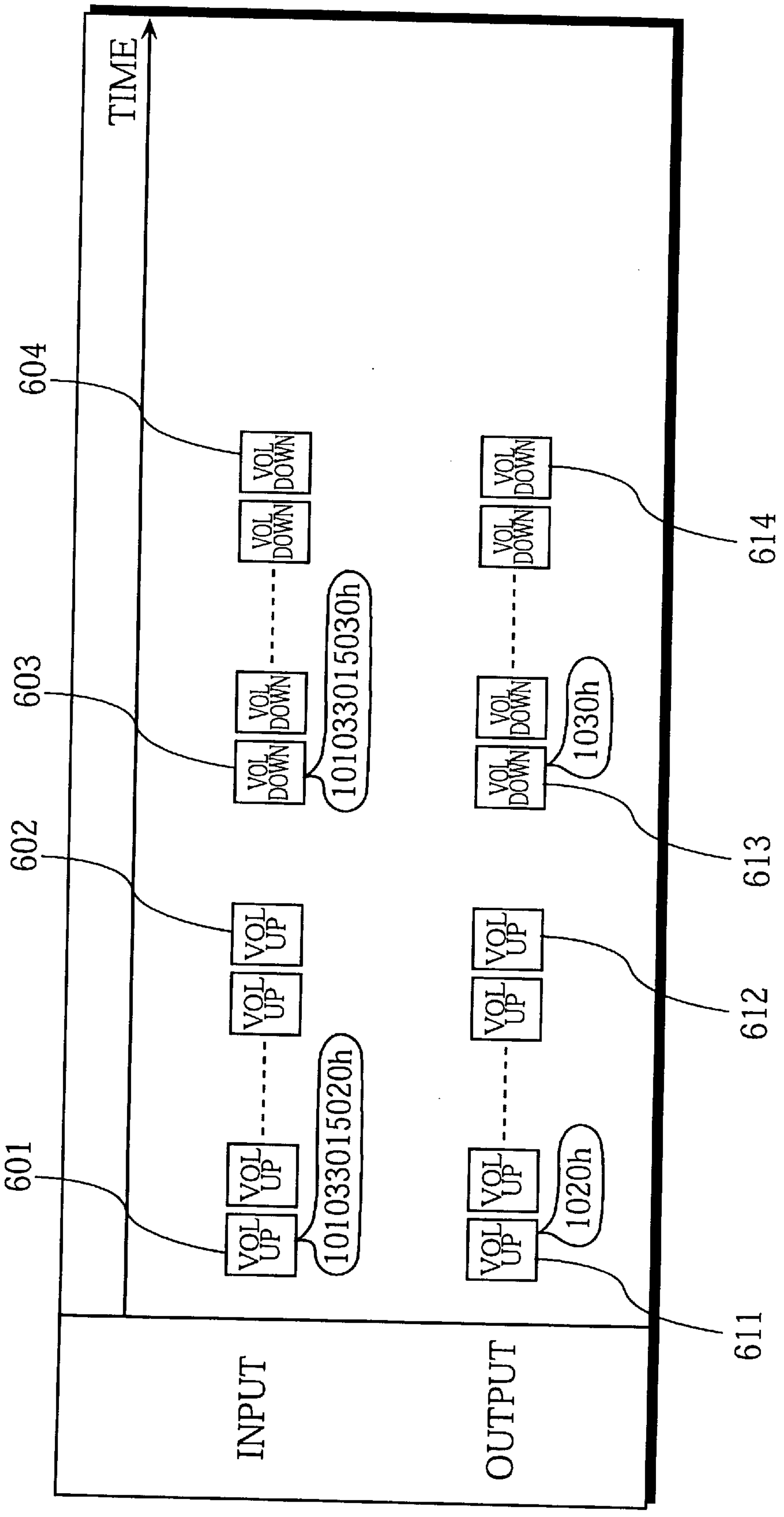
FIG. 13 shows examples of control data that are input into and output from remote control signal reception controller 3500.

FIG. 13 shows examples of control data that are input into and output from remote control signal reception controller 3500.

The input control data represents control data that remote control signal reception controller 3500 receives, while the output control data is control data that remote control signal reception controller 3500 instructs CPU 3170 to read by interrupting CPU 3170. A piece of input control data is a piece of 6 bytes of data, while a piece of output control data is converted to a piece of 2 bytes of data so that the output data is easily dealt with by CPU 3170.

In FIG. 13, one box represents one piece of control data. More specifically, a box "VOL UP" represents a piece of control data that is input into remote control signal reception controller 3500 when the user presses volume control button 207 on remote control signal sender 200 to raise the volume of TV monitor 310. A box "VOL DOWN" represents a piece of control data when the user presses volume control button 207 to decrease the volume (refer to FIG. 5).

FIG. 13 shows that as a result of continuous transmission of remote control signals from remote control signal sender 200, "VOL UP" control data 601 to 602 which each has the value "101033015020h" are continuously input into remote control signal reception controller 3500, while "VOL UP" control data 611 to 612 which each has the value "1020h" are output from remote control signal reception controller 3500. "VOL DOWN" control data 603 to 604 which each has the value of "101033015030h" are continuously input into remote control signal reception controller 3500, while "VOL DOWN" control data 613 to 614 which each has the value of "1030h" are output from remote control signal reception controller 3500.

The remote control signal reception controller in the present embodiment converts received control data into a command that the CPU easily deal with, when interrupting the CPU to inform the CPU of the received control data. When the CPU should be continuously informed of received control data, the remote control signal reception controller informs the CPU of the received control data without stopping.

(Third Embodiment)

A remote control signal reception controller according to the present invention is explained in detail in the third embodiment as one example. The remote control signal reception controller copes with the situation in which the user presses buttons on the remote control signal sender twice.

Figure 14:
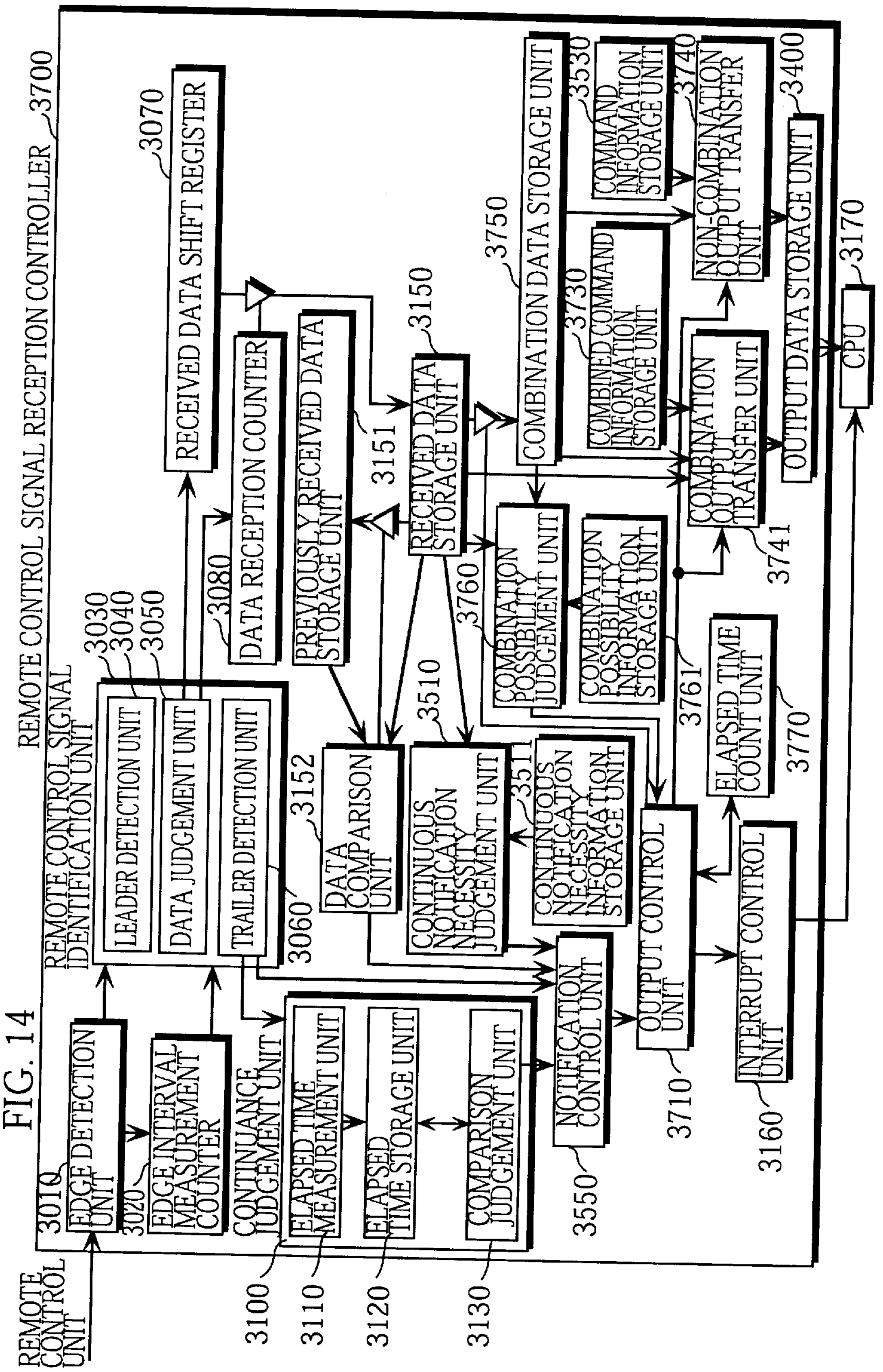
FIG. 14 shows a construction of the remote control signal reception controller in the third embodiment.

FIG. 14 shows a construction of the remote control signal reception controller in the third embodiment.

In FIG. 14, the same reference numbers are given to the same elements in remote control signal reception controller 3500 in the second embodiment.

The same elements as in the second embodiment are explained briefly.

The remote control signal reception system includes remote control signal reception controller 3700 and CPU 3170. The remote control signal reception system is part of a digital broadcast reception terminal. CPU 3170 controls a variety of functions on receiving digital broadcasts.

Remote control signal reception controller 3700 includes edge detection unit 3010, edge interval measurement counter 3020, remote control signal identification unit 3030, received data shift register 3070, data reception counter 3080, continuance judgement unit 3100, received data storage unit 3150, previously received data storage unit 3151, data comparison unit 3152, output data storage unit 3400, interrupt control unit 3160, command information storage unit 3530, output transfer unit 3540, continuous notification necessity information storage unit 3511, continuous notification necessity judgement unit 3510, combination data storage unit 3750, combination possibility information storage unit 3761, combination possibility judgement unit 3760, combined command information storage unit 3730, combination output transfer unit 3741, non-combination output transfer unit 3740, output control unit 3710, elapsed time count unit 3770, and notification control unit 3550. Combination data storage unit 3750 stores the control data stored in received data storage unit 3150 when the control data is transferred. Combination possibility information storage unit 3761 stores in advance the information on the sets of a plurality of pieces of control data that may be combined. Combination possibility judgement unit 3760 refers to combination possibility information storage unit 3761, and judges whether it is possible to combine the control data stored in received data storage unit 3150 and in combination data storage unit 3750. Combined command information storage unit 3730 stores commands each of which corresponds to a combination of a plurality pieces of control data in advance. Combination output transfer unit 3741 combines the control data in combination data storage unit 3750 and in received data storage unit 3150, obtains a command corresponding to the combination on referring to combined command information storage unit 3730, and stores the command in output data storage unit 3400. Non-combination output transfer unit 3740 stores the control data stored in combination data storage unit 3750 in output data storage unit 3400 on referring to command information storage unit 3530. Output control unit 3710 instructs non-combination output transfer unit 3740 or combination output transfer unit 3741 to transfer the command to output data storage unit 3400 on referring to the result of the judgement by combination possibility judgement unit 3760. Output control unit 3710 instructs interrupt control unit 3160. When a predetermined period of time elapses after control data is stored in combination data storage unit 3750, output control unit 3710 has elapsed time count unit 3770 count the elapsed time so that CPU 3170 is informed of the command corresponding to the stored control data. Notification control unit 3550 gives output control unit 3710 an output instruction.

The predetermined period of time is two seconds. When the user presses buttons on the remote control signal sender twice, and when the interval of these presses is shorter than the predetermined period of time, these two presses represent one meaning. For instance, when the user presses the remote control signal sender button "1" twice repeatedly, and when the interval of these presses is shorter than two seconds, these two presses of the button "1" represent "11". When the interval is equal to or longer than two seconds, these two presses represent "1" and "1". When the user presses the buttons "1" and "2" repeatedly in less than two seconds, these presses represent "12". When the user presses the button "2" after 2 or more seconds have elapsed since pressing the button "1", these presses represent "1" and "2".

Combination possibility information storage unit 3761 stores sets of pieces of control data that may be combined in advance. As a principle, when the control data is expressed as "1", "2", "3", and "4", combination possibility information storage unit 3761 stores such a set expressed as "1 and 1", "1 and 2", "1 and 3", or "1 and 4".

Combined command information storage unit 3730 stores the information on command that is output when two pieces of control data are combined.

Figure 15:
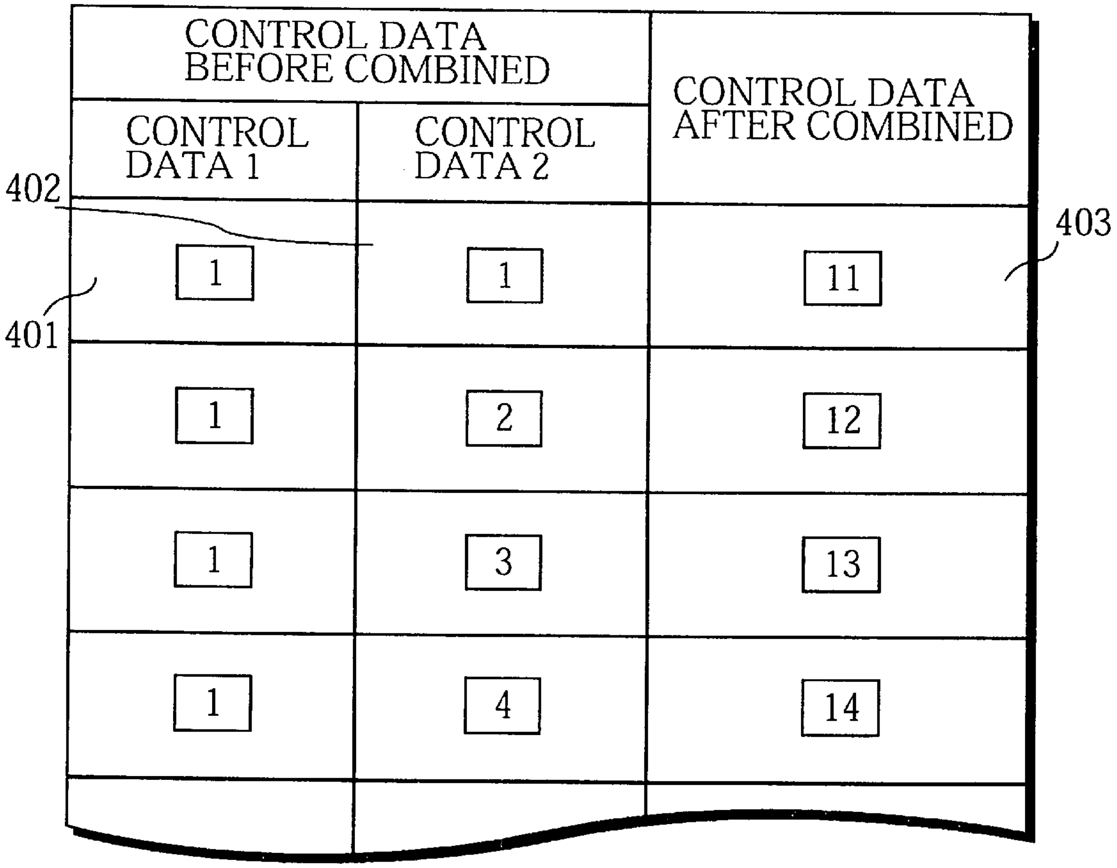
FIG. 15 shows a representation of the information stored in combined command information storage unit 3730.

FIG. 15 shows an image of the information stored in combined command information storage unit 3730.

FIG. 15 shows that the command "11" is output when the control data expressed as "1" and "1" are combined. When the control data expressed as "1" and "2" are combined, the command "12" is output. When the control data expressed as "1" and "3" are combined, the command "13" is output.

After storing a command in output data storage unit 3400, combination output transfer unit 3741 overwrites 10 over the control data in received data storage unit 3150 and combination data storage unit 3750. After storing a command in output data storage unit 3400, non-combination output transfer unit 3740 overwrites "0" over the control data in combination data storage unit 3750.

The operations performed by the remote control signal reception controller in the third embodiment are explained with reference to FIGS. 16 and 17.

Figure 16:
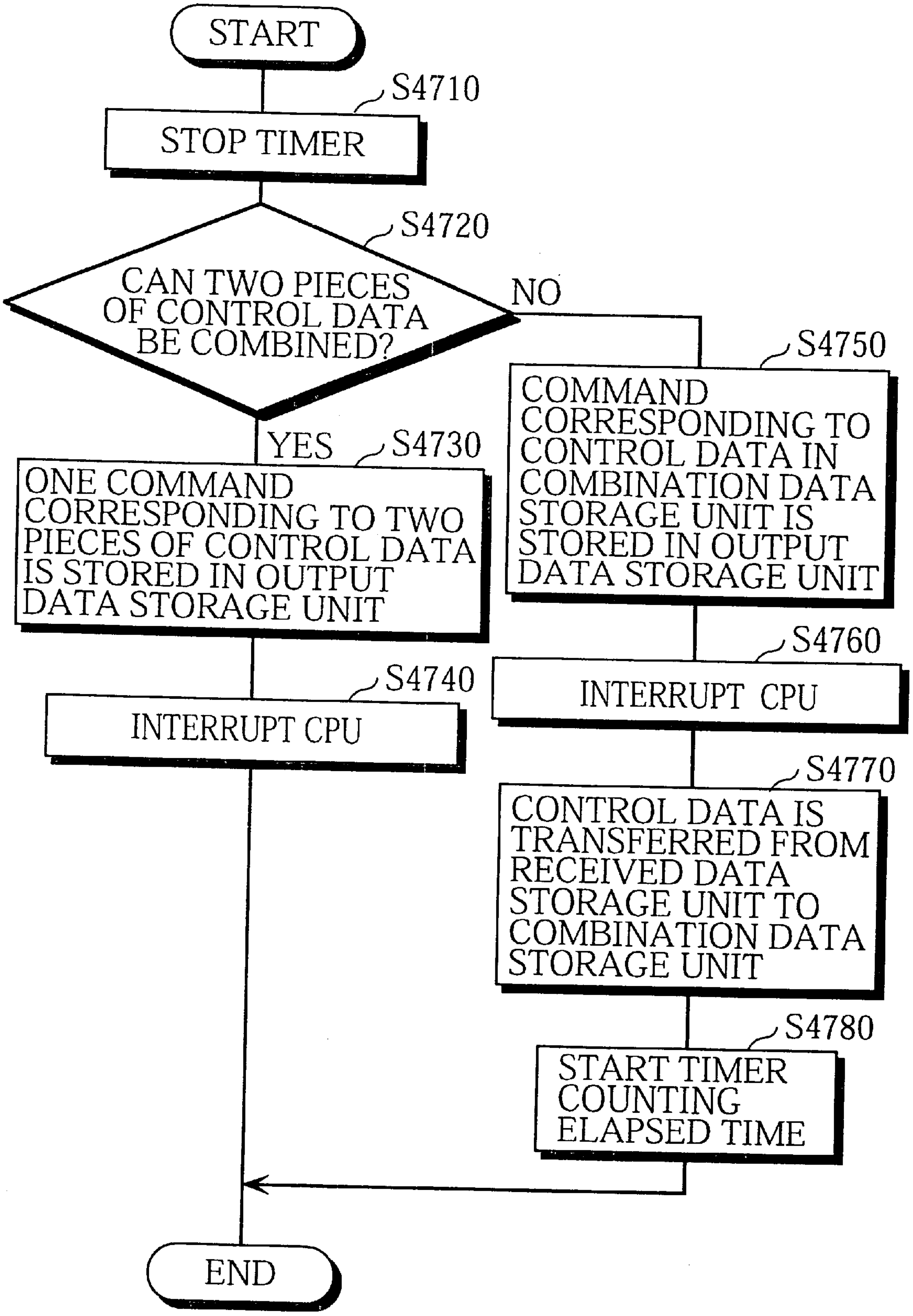
FIG. 16 is a flowchart showing the operation by the remote control signal reception controller in the third embodiment after a trailer detection.

FIG. 16 is a flowchart showing operations performed by remote control signal reception controller 3700 in the third embodiment.

The flowchart in FIG. 16 shows only the operations after notification control unit 3550 gives an output instruction to output control unit 3710. In other words, FIG. 16 shows the operations corresponding to Steps S4560 and S4570 in the flowchart in FIG. 12 that shows operations by remote control signal reception controller 3500 in the second embodiment. The operations not shown in FIG. 16 are the same as performed by the remote control signal reception controller in the second embodiment.

When receiving an output instruction from notification control unit 3550, output control unit 3710 stops elapsed time count unit 3770 counting (Step S4710).

Output control unit 3710 obtains the judgement result from combination possibility judgement unit 3760, which refers to combination possibility information storage unit 3761 and judges whether it is possible to combine the control data stored in received data storage unit 3150 and the control data stored in combination data storage unit 3750. The next operation depends on the judgement result by combination possibility judgement unit 3760 (Step S4720).

When it is possible to combine the two pieces of control data, output control unit 3710 controls combination output transfer unit 3741 so that combination output transfer unit 3741 obtains the command corresponding to the two pieces of control data from combined command information storage unit 3730 and stores the command in output data storage unit 3400 (Step S4730). Output control unit 3710 controls interrupt control unit 3160 so that interrupt control unit 3160 interrupts CPU 3170 (Step S4740).

When it is impossible to combine the two pieces of control data, output control unit 3710 controls non-combination output transfer unit 3740 so that non-combination output transfer unit 3740 obtains the command corresponding to the control data stored in combination data storage unit 3750 from command information storage unit 3530 and stores the obtained command in output data storage unit 3400 (Step S4750). Output control unit 3710 controls interrupt control unit 3160 so that interrupt control unit 3160 interrupts CPU 3170 (Step S4760). Output control unit 3710 has the control data be transferred from received data storage unit 3150 to combination data storage unit 3750 (Step S4770), and starts elapsed time count unit 3770 counting (Step S4780).

By the operations described above, two pieces of control data that may be combined is transferred to CPU 3170 as one command.

When elapsed time count unit 3770 starts counting, the count value is set at "0" and is gradually increased as the time proceeds. When the count value reaches the value corresponding to two seconds, elapsed time count unit 3770 informs output control unit 3710 that two seconds has passed.

Figure 17:
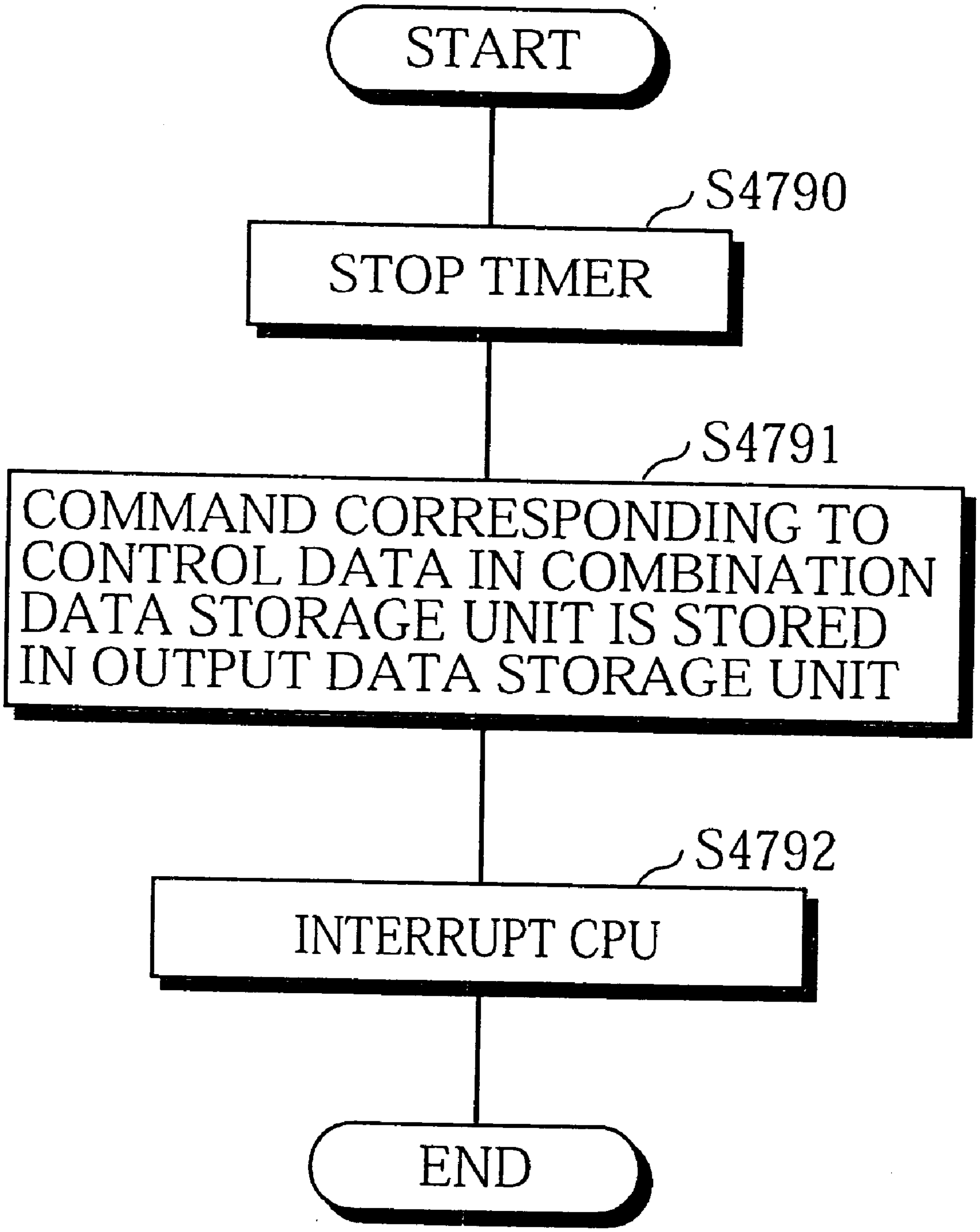
FIG. 17 is a flowchart showing operations performed by output control unit 3710 when output control unit 3710 is informed of the elapse of two seconds.

FIG. 17 is a flowchart showing the operations performed by output control unit 3710 when informed that two seconds has passed by elapsed time count unit 3770.

Output control unit 3710 stops elapsed time count unit 3770 counting (Step S4790), and controls non-combination output transfer unit 3740. Non-combination output transfer unit 3740 obtains the command corresponding to the control data stored in combination data storage unit 3750 on referring to command information storage unit 3530, and stores the obtained command in output data storage unit 3400 (Step S4791). Output control unit 3710 controls interrupt control unit 3160 so that interrupt control unit 3160 interrupts CPU 3170 (Step S4792).

When two seconds have passed since the user presses a button on the remote control signal sender, when the user presses no button, and when remote control signal reception controller 3700 receives a remote control signal transmitted from the remote control signal sender, CPU 3170 is informed of the command corresponding to the transmitted remote control signal. As a result, one button on the remote control signal sender is handled as one remote control signal sender button.

Figure 18:
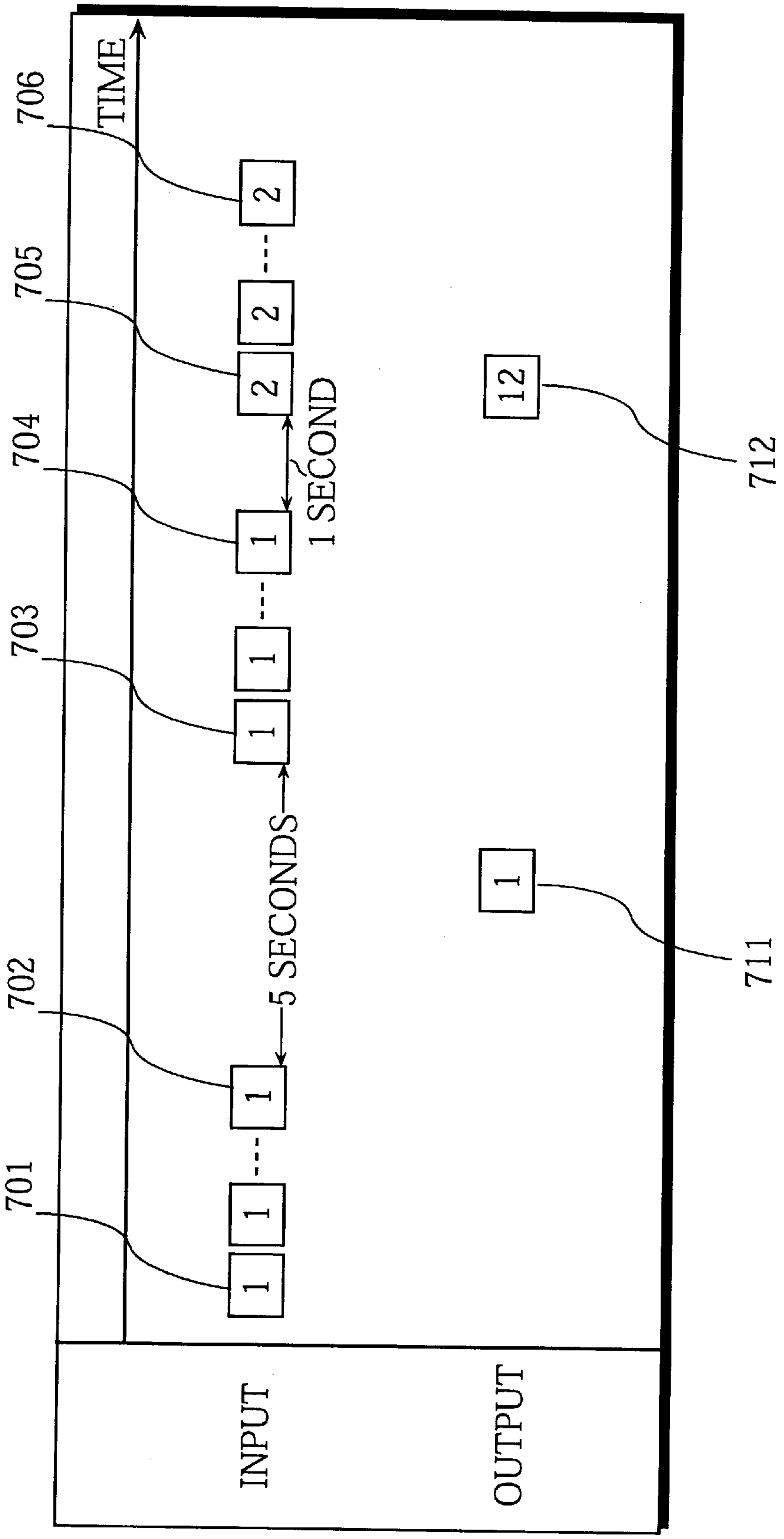
FIG. 18 shows examples of control data that are input into and output from remote control signal reception controller 3700.

FIG. 18 shows examples of control data that are input into and output from remote control signal reception controller 3700.

The input control data represents control data that remote control signal reception controller 3700 receives, while the output control data represents control data that remote control signal reception controller 3700 instructs CPU 3170 to read by interrupting CPU 3170.

In FIG. 18, one box represents one piece of control data. More specifically, a box "1" represents a piece of control data that is input into remote control signal reception controller 3700 when the user presses numerical figure button 203 on which "1" is written. A box "2" represents a piece of control data when the user presses numerical figure button 203 on which "2" is written (refer to FIG. 5).

FIG. 18 shows that as a result of continuous transmission of remote control signals from remote control signal sender 200, "1" control data 701 to 702 are continuously input into remote control signal reception controller 3700. When two seconds have passed since the input of "1" control data 702, "1" control data 711 is output from remote control signal reception controller 3700. When "2" control data 705 is input into remote control signal reception controller 3700 after one second has passed since the continuous input of "1" control data 703 to 704 is completed, "12" control data 712 is output from remote control signal reception controller 3700.

When the user presses numerical figure button 203 on which "1" is written and that on which "2" is written in a short period of time, and when two pieces of control data "1" and "2" are input into the remote control signal reception controller in the present embodiment in a short period of time, the remote control signal reception controller combines these two pieces of control data, and informs the CPU of the command "12".

(Fourth Embodiment)

A remote control signal reception controller according to the present invention is explained in detail in the fourth embodiment as one example. The remote control signal reception controller transfers the continuously received control data after thinning out the received control data.

Figure 19:
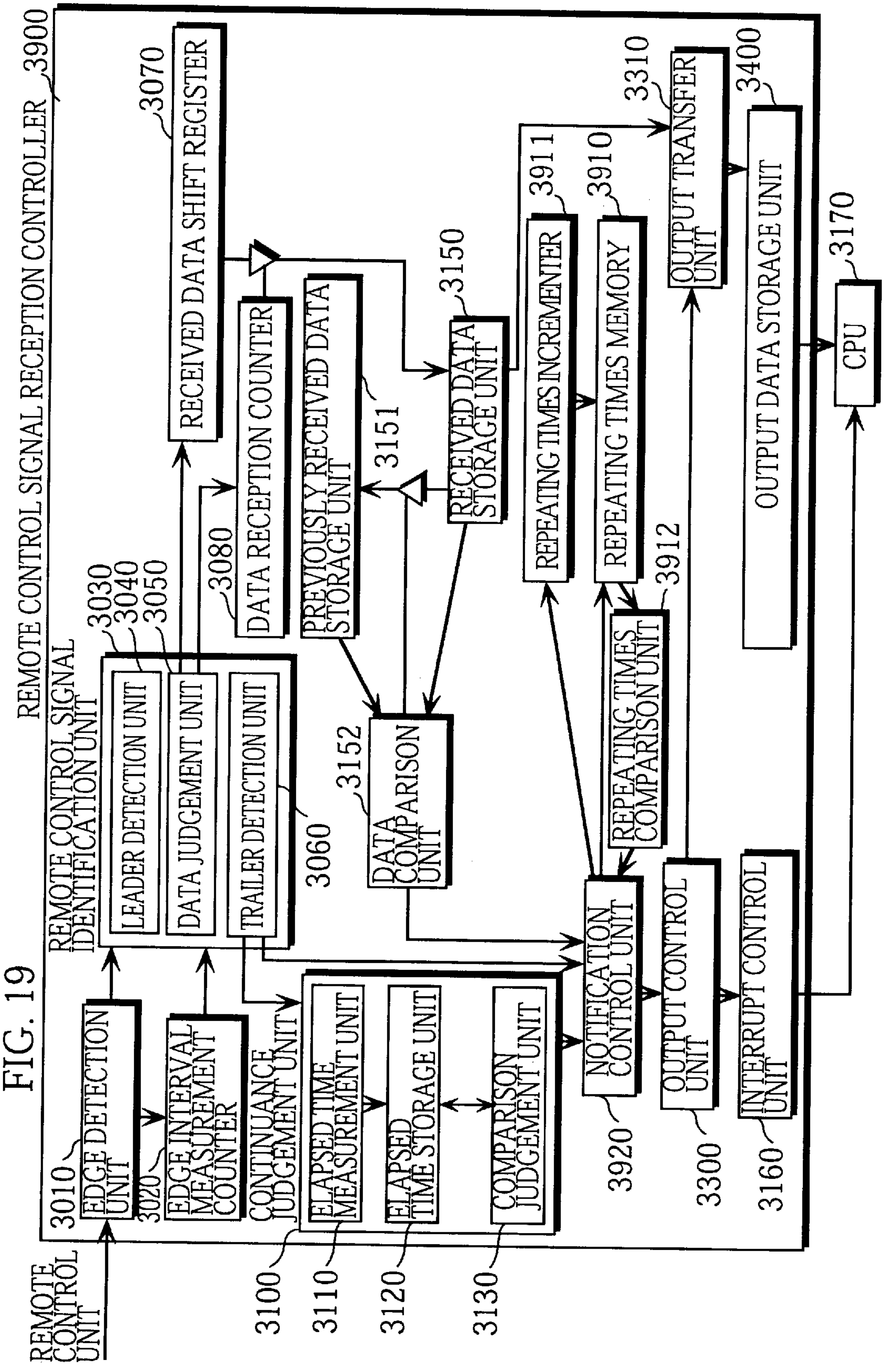
FIG. 19 shows the construction of the remote control signal reception controller in the fourth embodiment.

FIG. 19 shows a construction of the remote control signal reception controller in the fourth embodiment.

In FIG. 19, the same reference numbers are given to the same elements in remote control signal reception controller 3000 in the first embodiment.

The same elements as in the first embodiment are explained briefly.

The remote control signal reception system includes remote control signal reception controller 3900 and CPU 3170. The remote control signal reception system is part of a digital broadcast reception terminal. CPU 3170 controls a variety of functions on receiving digital broadcasts.

Remote control signal reception controller 3900 includes edge detection unit 3010, edge interval measurement counter 3020, remote control signal identification unit 3030, received data shift register 3070, data reception counter 3080, continuance judgement unit 3100, received data storage unit 3150, previously received data storage unit 3151, data comparison unit 3152, output data storage unit 3400, interrupt control unit 3160, output transfer unit 3310, output control unit 3300, repeating times memory 3910, repeating times incrementer 3911, repeating times comparison unit 3912, and notification control unit 3920. Repeating times memory 3910 stores the input repeating times of control data that is continuously input. When data comparison unit 3152 finds that the control data in previously received data storage unit 3151 and in received data storage unit 3150 are the same, repeating times incrementer 3911 increases the value in repeating times memory 3910 by one. Repeating times comparison unit 3912 compares the value of repeating times with a predetermined value. Notification control unit 3920 judges whether control data should be output using the result of the judgement and the comparison by continuance judgement unit 3100, data comparison unit 3152, and repeating times comparison unit 3912, and gives output control unit 3300 an output instruction.

The predetermined value that repeating times comparison unit 3912 uses as the comparison standard is "3".

Finding that the same control data is received three consecutive times from the comparison result by repeating times comparison unit 3912, comparison control unit 3920 gives output control unit 3300 an output instruction. After giving output control unit 3300 an output instruction, notification control unit 3920 sets the value of the repeating times stored in repeating times memory 3910 as "0".

As a result, when continuously received, a piece of data is output every three times the data is received. In other words, when a piece of control data is continuously received, the received control data is output after being thinned out. For instance the first-received, the fourth-received, the seventh-received, the tenth-received, and the thirteenth-received control data are output.

The other functions of notification control unit 3920 are the same as notification control unit 3200 in the first embodiment. When the interval of the reception of control data and the previously received control data is longer than 200 milliseconds, when the just received control data and the previously received control data are different, and when the same piece of control data is received multiple of three consecutive times, notification control unit 3920 instructs output control unit 3300 to output the piece of control data.

The operations by remote control signal reception controller 3900 in the fourth embodiment are explained with reference to FIG. 20.

Figure 20:
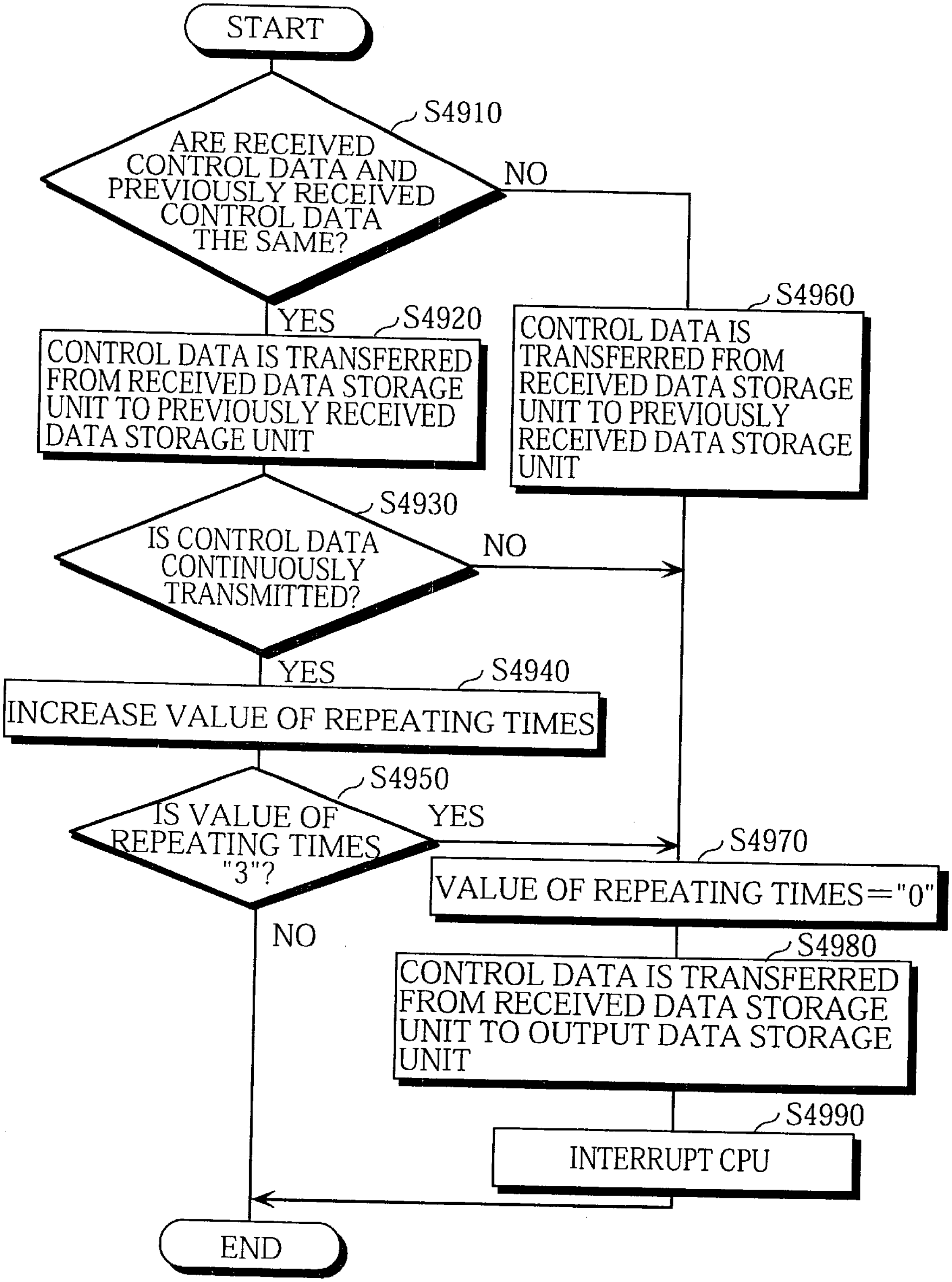
FIG. 20 is a flowchart showing operations performed by the remote control signal reception controller in the fourth embodiment.

FIG. 20 is a flowchart showing operations performed by remote control signal reception controller 3900 in the fourth embodiment.

The flowchart in FIG. 20 shows only the operations corresponding to Steps S4130, S4150, S4160, S4170, and S4180 in the flowchart in FIG. 7 that shows the operations by remote control signal reception controller 3000 in the first embodiment. In other words, the flowchart in FIG. 20 shows the operations of remote control signal reception controller 3900 after notification control unit 3920 is informed of a trailer detection by remote control signal identification unit 3030. The operations not shown in FIG. 20 are the same as performed by remote control signal reception controller 3000 in the first embodiment.

After receiving the notification of a trailer detection, notification control unit 3920 judges the result of the comparison between the control data stored in received data storage unit 3150 and previously received data storage unit 3151 by data comparison unit 3152 (Step S4910). When the comparison by data comparison unit 3152 shows that the control data are different, the process proceeds to Step S4960. When the comparison shows that the control data are the same, the process proceeds to Step S4920. The operation at Step S4910 is the same as at Step S4130 of the flowchart in the first embodiment.

The operations at Steps S4920 and S4960 are the same as at Steps S4140 and S4160 of the flowchart in the first embodiment. The control data stored in received data storage unit 3150 is transferred to previously received data storage unit 3151.

After Step S4920, notification control unit 3920 controls output control unit 3300 based on the result of the judgement by continuance judgement unit 3100 whether the control data is part of continuously transmitted control data (Step S4930).

When the control data is part of continuously transmitted control data, notification control unit 3920 has repeating times incrementer 3911 increase the value of the repeating times stored in repeating times memory 3910 by one (Step S4940), and judges whether the value of the repeating times is 11311 using repeating times comparison unit 3912 (Step S4950).

When notification control unit 3920 judges that the value of the repeating times is not "3", no control data is output from remote control signal reception controller 3900, and the process in which a trailer signal is received is completed here.

When the control data is not part of continuously transmitted data (Step S4930), when the value of the repeating times stored in repeating times memory 3910 is "3" (Step S4950), and when the operation at Step S4960 is completed, notification control unit 3920 sets the value of the repeating times stored in repeating times memory 3910 as "0" (Step S4970). Notification control unit 3920 has output control unit 3300 control output transfer unit 3310 so that the control data is transferred from received data storage unit 3150 to output data storage unit 3400 (Step S4980), and has output control unit 3300 control interrupt control unit 3160 so that CPU 3170 is interrupted (Step S4990).

The process in which a trailer signal is received is completed here.

Figure 21:
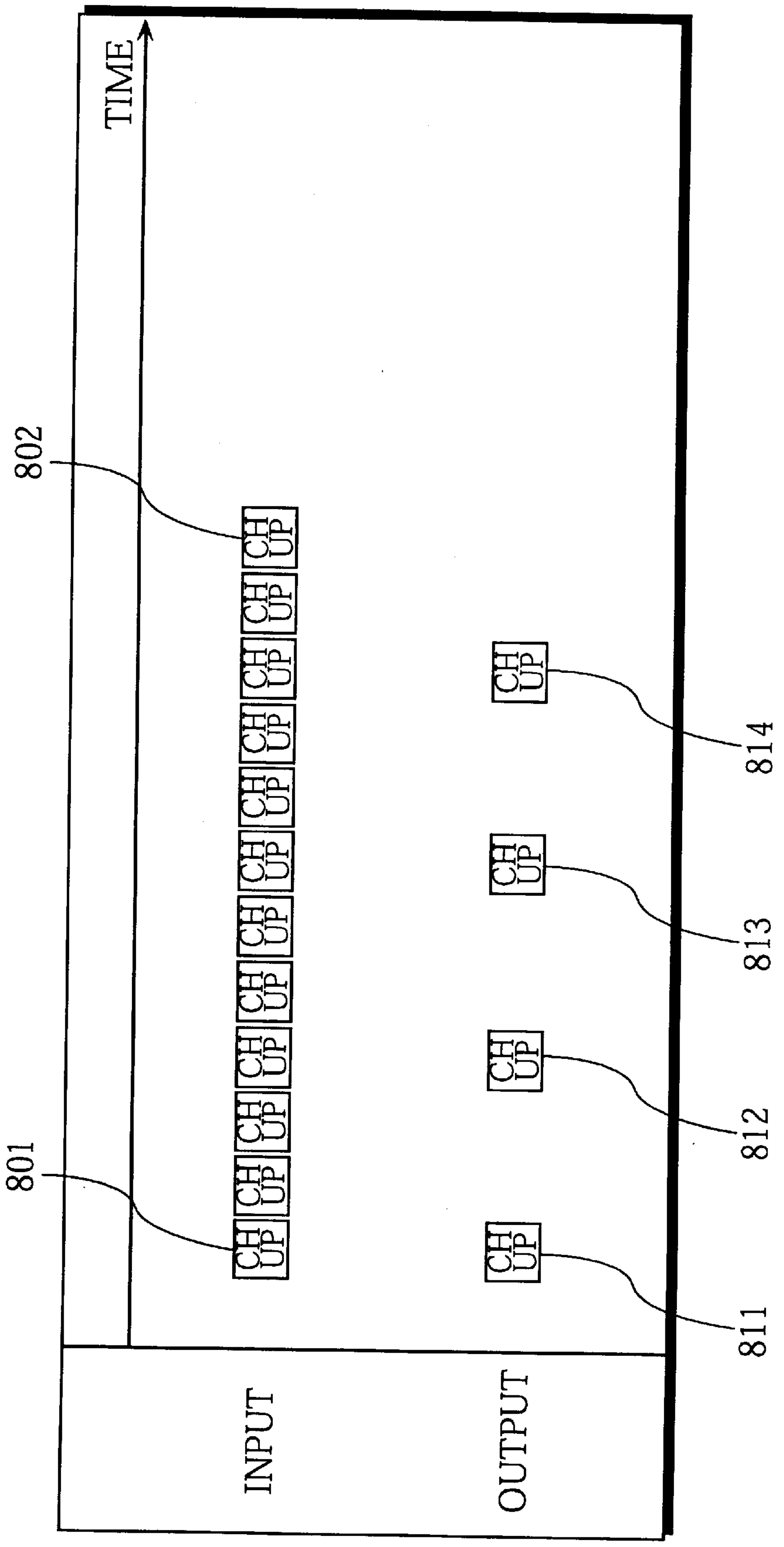
FIG. 21 shows examples of control data that are input into and output from remote control signal reception controller 3900.

FIG. 21 shows examples of control data that are input into and output from remote control signal reception controller 3900.

The input control data represent the control data that remote control signal reception controller 3900 receives, while the output control data represent the control data that remote control signal reception controller 3900 instructs CPU 3170 to read by interrupting CPU 3170.

In FIG. 21, one box represents one piece of control data. More specifically, a box "CH UP" represents a piece of control data that is input into remote control signal reception controller 3900 when the user presses channel switch button 206 on remote control signal sender 200 to switch the channels in the order of increasing number (refer to FIG. 5).

FIG. 21 shows that as a result of continuous transmission of remote control signals from remote control signal sender 200, "CH UP" control data 801 to 802 are continuously input into remote control signal reception controller 3900. "CH UP" control data 811 is output corresponding to the input of "CH UP" control data 801 that is the first-input control data. After the input of "CH UP" control data 801, each piece of "CH UP" control data 812, 813, and 814 is output when a piece of "CH UP" control data is input multiple of three consecutive times.

When the user presses channel switch button 206 continuously, it is possible for remote control signal reception controller 3900 in the present embodiment to reduce the load on the CPU by thinning out the received control data when informing the CPU of the reception of the received control data.

(Fifth Embodiment)

A remote control signal reception controller according to the present invention is explained in detail in the fifth embodiment as one example. The remote control signal reception controller directly controls a variety of peripheral devices.

Figure 22:
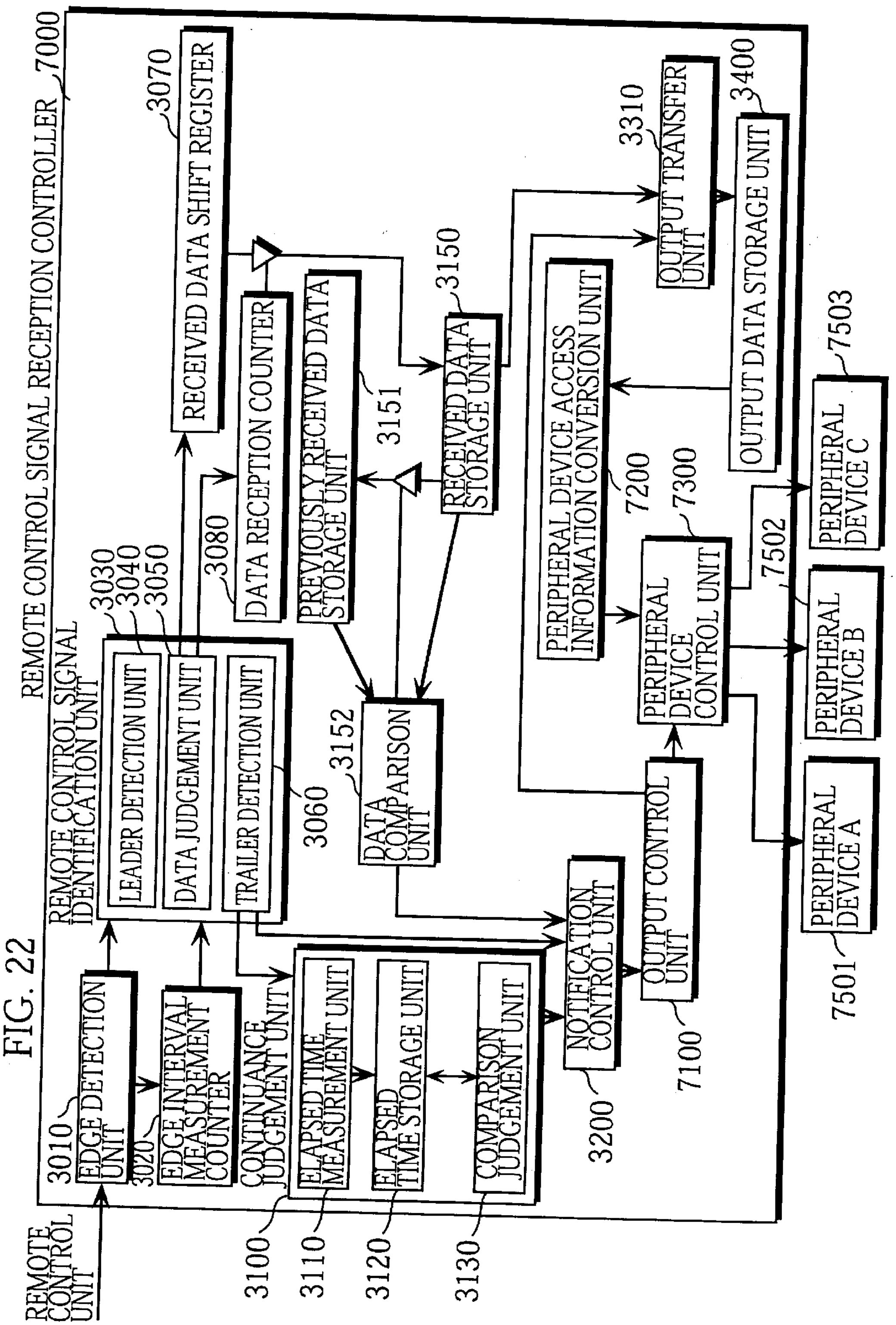
FIG. 22 shows the construction of the remote control signal reception controller in the fifth embodiment.

FIG. 22 shows a construction of the remote control signal reception controller in the fifth embodiment.

In FIG. 22, the same reference numbers are given to the same elements in remote control signal reception controller 3000 in the first embodiment.

The same elements as in the first embodiment are explained briefly.

The remote control signal reception system includes remote control signal reception controller 7000 and peripheral devices A 7501, B 7502, and C 7503.

Remote control signal reception controller 7000 includes edge detection unit 3010, edge interval measurement counter 3020, remote control signal identification unit 3030, received data shift register 3070, data reception counter 3080, continuance judgement unit 3100, received data storage unit 3150, previously received data storage unit 3151, data comparison unit 3152, output data storage unit 3400, output transfer unit 3310, notification control unit 3200, peripheral device access information conversion unit 7200, peripheral device control unit 7300, and output control unit 7100. Device access information conversion unit 7200 converts the data stored in output data storage unit 3400 into the address and the data for accessing a peripheral device. Peripheral device control unit 7300 accesses peripheral device A 7501, B 7502, or C 7503 using the address and the data into which peripheral device access information conversion unit 7200 converts. Output control unit 7100 receives an output instruction from notification control unit 3200, instructs output transfer unit 3310 to transfer control data, and instructs peripheral device control unit 7300 to access a peripheral device.

Peripheral device access information conversion unit 7200 stores addresses and data corresponding to control data for accessing peripheral devices as fixed values in advance.

The operations performed by remote control signal reception controller 7000 in the fifth embodiment are explained below.

The operations from the reception of a remote control signal to the output instruction from notification control unit 3200 to output control unit 7100 are the same as remote control signal reception controller 3000 in the first embodiment. In other words, the operations by remote control signal reception controller 7000 are different from those in the flowchart in FIG. 7 only in the operation at the step corresponding to Step S4180 in the flowchart in FIG. 7. The operation performed by remote control signal reception controller 7000 at this step is explained below. Output control unit 7100 that has received an output instruction from notification control unit 3200 instructs peripheral device control unit 7300 to access a peripheral device. On receiving the instruction from output control unit 7100, peripheral device control unit 7300 controls peripheral device access information conversion unit 7200 so that the received control data should be converted into the corresponding address and data that is stored in output data storage unit 3400, and accesses to peripheral device A 7501, B 7502, or C 7503.

As a result, it is possible for remote control signal reception controller 7000 in the fifth embodiment to control a peripheral device without a CPU.

While the remote control signal reception controller according to the present invention has been explained based on these embodiments, as a matter of course, the present invention is not limited by these embodiments.

(1) While comparison judgement unit 3130 in continuance judgement unit 3100 in the first to fifth embodiments judges whether the elapsed time is longer than 200 milliseconds, the value for judging whether control data is continuously transmitted is not limited to 200 milliseconds. The value may, for instance, be 300 or 400 milliseconds.

(2) When judging whether control data is continuously transmitted using the interval between trailer detection signals in the first to fifth embodiments, continuance judgement unit 3100 may use another method for the judgement. For instance, the interval between leader detection signals, or the interval between control data receptions may be used.

(3) While the size of control data, the capacity of received data storage unit 3150, and the capacity of previously received data storage unit 3151 are all set at six bytes in the first to fifth embodiments, the size or the capacity may be set at any number of bytes.

(4) While set at 60 bytes in the first to fifth embodiments, the capacity of output data storage unit may be set at any number of bytes.

(5) While accessed according to FIFO in the first to fifth embodiments, the output data storage unit may be accessed by the CPU in a random order.

(6) Bit data including manufacturer code, parity, appliance code, and data code is stored in received data storage unit 3150 as control data, and such control data is transferred and compared in the operations in the first to fifth embodiments. Data code, which is the remainder of control data after subtracting manufacturer code, parity, and appliance code, may be transferred and compared in the operations as described in the more specific embodiment. In other words, the control code output to the CPU may be the control data that the remote control signal reception controller receives, or alternatively only the data code that is included in the control data. This is because a piece of control data transmitted to a remote control signal reception controller includes manufacturer code, parity, and appliance code which always have the same contents. When a piece of control data includes a different manufacturer code, parity, and/or appliance code, the control data is included in a remote control signal of which the CPU does not need to be informed. As a result, when remote control signal identification unit 3030 detects a trailer, and when the values of the manufacturer code, the parity, and the appliance code included in the control data stored in received data storage unit 3150 are found to be different from the normal value that has been stored in advance, the notification control unit may not be informed of the trailer detection.

(7) While command information storage unit 3530 stores a table in which control data and commands are related in the second and third embodiments, it is not necessary to store all control data and the commands corresponding to the control data in advance. A command corresponding to a piece of control data may be obtained according to a function (calculation). Combined command information storage unit 3730, combination possibility information storage unit 3761, and continuous notification necessity information storage unit 3511 may also perform a functional operation. In other words, combined command information storage unit 3730 may input a set of control data and output a combined command, combination possibility information storage unit 3761 may input a set of control data and output binary information about the possibility of the combination of the set of control data, and continuous notification necessity information storage unit 3511 may input control data and output binary information about the necessity of continuous informing of the input control data when performing a functional operation.

In these embodiments, when numerical figure buttons "1" and "2" are pressed, the remote control signal reception controller combines the control data and sends a command representing "12" to the CPU. It is possible for the remote control signal reception controller to combine the control data represented by numerical figures, for instance, "1" and "2" and send a command representing a character, for instance, "A" to the CPU.

(8) When generating an interrupt the CPU in the first to fourth embodiments, interrupt control unit 3160 may change the type of interrupt according to the condition of received control data. The conditions are for instance, the condition that received control data and the previously received control data are the same, the condition that received control data and the previously received control data are different, the condition that received control data can be compressed, and the condition that received control data cannot be compressed. As a result, the CPU may distinguish the meaning of an interrupt.

(9) When finally stored in output data storage unit 3400 in the first and fourth embodiments, the received control data may be stored in one out of a plurality of divided areas, for instance, areas "A", "B", and "C", or the like of in output data storage unit 3400 according to the contents of the received control data. In this case, it is necessary for output transfer unit 3310 to store a table in which control data and area are related or a function for judging which an area should store received data in order to select an area to which received control data should be transferred according to the contents of the received control data.

(10) While control data is output every three consecutive times the control data is received in the fourth embodiment, control data may be output at any interval. For instance, control data may be output every two or four consecutive times the control data is received. The interval may change according to the contents of received control data. In this case, it is necessary for repeating times comparison unit 3912 to store a table in which control data and standard internals are related, and to change the interval on referring to the contents of received control data stored in received data storage unit 3150.

(11) Although elapsed time count unit 3770 informs output control unit 3710 that two seconds have passed in the fifth embodiment, elapsed time count unit 3770 may inform output control unit 3710 that any length of time, for instance, one or three second(s) have passed. When two remote control signals are received within the informed length of time, it is possible to combine these two remote control signals. When the user presses one button on the remote control signal sender within the informed length of time after pressing a button, it is possible for the two commands to be dealt with as one command.

(12) While two pieces of control data are combined to create one command in the fifth embodiment, the number of pieces of control data is not limited to two. Three or four pieces of control data may be combined to create one command. In this case, combination possibility information storage unit 3761 stores in advance sets of three or four pieces of control data that can be combined, and combination data storage unit 3750 has the capacity to store three or four pieces of control data.

(13) While received control data is used to control a peripheral device in the construction of the remote control signal reception controller in the fifth embodiment, a CPU may be included in the remote control signal reception controller and may be informed of the received control data. In this case, it is necessary for the remote control signal reception controller to include an interrupt control unit for interrupting the CPU, and a CPU notification storage unit for storing the information about the control data of which the CPU should be informed. It is also necessary for the remote control signal reception controller to have output control unit 7100 control the interrupt control unit on referring to the CPU notification storage unit and output data storage unit 3400.

(14) Notification control unit 3200 in the first embodiment outputs received control data to CPU 3170 when received control data and the previously received control data are different, using the comparison result by data comparison unit 3152. It is possible for notification control unit 3200 to output received control data to CPU 3170 without using the comparison result by data comparison unit 3152 only when continuance judgement unit 3100 judges that the received control data and the previously received control data are not continuously received. In this case, when different control data are continuously received, not every piece of the received control data is output to CPU 3170. Such a situation, however, rarely occurs in the remote control signal reception controller when the continuance of the control data is judged fairly precisely. This is because such a remote control signal reception controller continuously receives different control data from the remote control signal sender based only on user operations. As a result, such a rare case does not matter in practical use of the remote control signal reception controller.

It is also possible for notification control unit 3200 to output received control data to CPU 3170 without using the judgement result by continuance judgement unit 3100 only when data comparison unit 3152 judges that received data and the previously received data are different. This method also prevents the same control data from being continuously output to CPU 3170.

(15) The remote control signal reception controller is included in a digital broadcast reception system in the example shown in the first embodiment. It is possible for a remote control signal reception controller according to the present invention to be included in a variety of devices that receive a remote control signal from a remote control signal sender and control a variety of units and/or devices.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A remote control signal reception controller that is connected to a CPU that controls operation of an electric appliance, receives control data for controlling the operation of the electric appliance transmitted from a remote control signal sender, and notifies the CPU of information on the received control data comprising:

reception means for receiving control data;

interval measurement means for measuring, when the reception means receives a second piece of control data following a first piece of control data, an interval between reception of the first and second piece of control data;

notification means for notifying the CPU of the information on the received control data by interrupting; and notification control means for having the notification means notify the CPU of information on the second piece of control data when the interval measured by the interval measurement means is larger than a first value that represents an interval between transmissions of a same piece of control data which is repeatedly transmitted from the remote control signal sender, and for preventing the notification means from notifying the CPU of the information on the second piece of control data irrelevant to a route via which the second piece of control data has been transmitted from the remote control signal sender to the reception means when the interval measured by the interval measurement means is equal to or smaller than the first value.

2. The remote control signal reception controller according to claim 1 further comprising identity judgement means for judging whether the first and second piece of control data are a same piece of control data when the reception means receives the second piece of control data following the first piece of control data, wherein when the identity judgement means judges that the first and second piece of control data are different, the notification control means does not prevent a notification of the information on the second piece of control data.

3. The remote control signal reception controller according to claim 2 further comprising continuous notification necessity information storage means for storing information in advance, the information showing whether continuous notification is necessary for each kind of control data, wherein when finding that the CPU needs to be notified of information on the second piece of control data on referring to the information stored in the continuous notification necessity information storage means, the notification control means does not prevent the notification of the information on the second piece of control data.

4. The remote control signal reception controller according to claim 3, wherein the CPU receives a command, and controls the operation of the electric appliance based on the received command;

the notification means includes a command information storage unit for storing information in advance, the information in which a piece of control data is related to a command; and the notification means refers to the information stored in the command information storage unit, and notifies the CPU of a command related to a piece of control data as the information on the piece of control data.

5. The remote control signal reception controller according to claim 2, wherein the notification means combines information on a piece of control data of which the notification control means has the notification means notify the CPU and information on at least one preceding piece of control data of which the notification control means has had the notification means notify the CPU but of which the notification means has not yet notified the CPU to generate a piece of combined information that has a different meaning from meanings of the original pieces of control data, and the notification means notifies the CPU of the combined information by interrupting the CPU once.

6. The remote control signal reception controller according to claim 5, wherein the notification means notifies the CPU of information on a piece of control data of which the notification control means has the notification means notify the CPU within a predetermined period of time of receiving a notification instruction from the notification control means.

7. The remote control signal reception controller according to claim 2 further comprising number detection means for detecting that a number of times a same piece of control data is received is equal to a second value, wherein when the number detection means detects that the number of times a same piece of control data has been received is equal to the second value, the notification control means does not prevent the notification of the information on the second piece of control data.

8. The remote control signal reception controller according to claim 2 further comprising:

received data storage means for storing control data;

previously received data storage means for storing control data; and previously received data transfer means for transferring control data from the received data storage means to the previously received data storage means, wherein the reception means stores the received control data in the received data storage means, the identity judgement means compares a second piece of control data that is stored in the received data storage means with a first piece of control data that is stored in the previously received data storage means, and judges whether the first and second piece of control data are a same piece of control data, the previously received data transfer means transfers a piece of control data from the received data storage means to the previously received data storage means after a judgement by the identity judgement means, the interval measurement means includes:

an elapsed time counter for counting elapsed time and storing a counted value; and a counter reset unit for resetting the elapsed time counter after the notification control means refers to the counted value stored in the elapsed time counter as the interval between the reception of the first and second piece of control data, and the notification means includes:

an output data storage unit for storing CPU-readable control data that the CPU is notified of;

an interrupt control unit for interrupting the CPU in order to request the CPU to read control data;

an output transfer unit for transferring control data from the received data storage means to the output data storage unit; and an output control unit for giving a transfer instruction to the output transfer unit and instructing the interrupt control unit to interrupt the CPU when receiving an instruction from the notification control means to notify the CPU of control data.

9. The remote control signal reception controller according to claim 8, wherein the notification means further includes:

a CPU notification information storage unit for storing information in advance, the information showing control data of which the CPU should be informed;

a peripheral device access information conversion unit for converting, when finding that the CPU should not be informed of a piece of control data stored in the output data storage unit on referring to the information stored in the CPU notification information storage unit, the piece of control data stored in the output data storage unit into an address corresponding to a peripheral device connected to the remote control signal reception controller and an input data for the peripheral device; and a peripheral device control unit for obtaining an address and an input data using the peripheral device access information conversion unit and controlling a peripheral device, and wherein when finding that the CPU should be notified of the second piece of control data the information of which the notification control means has the notification means notify the CPU on referring to the CPU notification information storage unit, the output control unit instructs the interrupt control unit to inform the CPU of the piece of control data, and when finding that the CPU should not be notified of the second piece of control data, the output control unit has the peripheral device control unit control a peripheral device.

10. A remote control signal reception controller that receives control data for controlling operation of an electric appliance transmitted from a remote control signal sender and notifies a CPU which controls the operation of the electric appliance of information on the received control data comprising:

reception means for receiving control data;

interval measurement means for measuring, when the reception means receives a second piece of control data following a first piece of control data, an interval between reception of the first and second piece of control data;

notification means for notifying the CPU of the information on the received control data by interrupting; and notification control means for having, only when the interval measured by the interval measurement means is larger than a first value that represents an interval between transmissions of a same piece of control data which is repeatedly transmitted from the remote control signal sender, the notification means notify the CPU of information on the second piece of control data, wherein the notification means includes:

a combined command information storage unit for storing information in advance, the information in which two pieces of control data that may be combined are related to a command that has a different meaning from a meaning of each of the two pieces of control data, an output data storage unit for storing a CPU-readable command that the CPU is notified of;

an interrupt control unit for interrupting the CPU in order to request the CPU to read a command; and an output control unit for judging whether it is possible to combine information on a piece of control data of which the notification control means has the notification means notify the CPU and information on at least one preceding piece of control data of which the notification control means has had the notification means notify the CPU but of which the notification means has not yet notified the CPU on referring to the information stored in the combined command information storage unit, for storing a command corresponding to a set of the information on the piece of control data and the information on the at least one piece of control data in the output data storage unit, and for instructing the interrupt control unit to interrupt the CPU when combining is possible.

11. The remote control signal reception controller according to claim 10, wherein the notification means further comprising a command information storage unit for storing information in advance, the information in which a piece of control data is related to a command, and the output control unit stores commands corresponding to control data of which the notification control means has the notification means notify the CPU in the output data storage unit within a predetermined period of time of receiving a notification instruction from the notification control means on referring to the information stored in the command information storage unit, and instructs the interrupt control unit to interrupt the CPU.

12. A remote control signal reception controller that is connected to a CPU that controls operation of an electric appliance, receives control data for controlling the operation of the electric appliance transmitted from a remote control signal sender, and notifies the CPU of information on the received control data comprising:

reception means for receiving control data;

identity judgment means for judging whether the first and second piece of control data are a same piece of control data when the reception means receives the second piece of control data following the first piece of control data;

notification means for notifying the CPU of the information on the received control data by interrupting; and notification control means for having the notification means notify the CPU of information on the second piece of control data when the identity judgement means judges that the first and second piece of control data are different, and for preventing the notification means from noting the CPU of the information on the second piece of control data irrelevant to a route via which the second piece of control data has been transmitted from the remote control signal sender to the reception means when the identity judgement means judges that the first and second piece of control data are the same piece of control data.

13. The remote control signal reception controller according to claim 12 further comprising continuous notification necessity information storage means for storing information in advance, the information showing whether the CPU needs to be informed of information on a piece of control data every time a piece of control data is received, wherein when finding that the CPU needs to be notified of information on the second piece of control data on referring to the information stored in the continuous notification necessity information storage means, the notification control means does not prevent the notification of the information on the second piece of control data.

14. The remote control signal reception controller according to claim 13, wherein the CPU receives a command, and controls the operation of the electric appliance based on the received command;

the notification means includes a command information storage unit for storing information in advance, the information in which a piece of control data is related to a command; and the notification means refers to the information stored in the command information storage unit, and notifies the CPU of a command related to a piece of control data as the information on the piece of control data.

15. The remote control signal reception controller according to claim 12 further comprising number detection means for detecting that a number of times a same piece of control data is received is equal to a second value, wherein when the number detection means detects that the number of times a same piece of control data has been received is equal to the second value, the notification control means does not prevent the notification of the information on the second piece of control data.

16. The remote control signal reception controller according to claim 12 further comprising:

received data storage means for storing control data;

previously received data storage means for storing control data; and previously received data transfer means for transferring control data from the received data storage means to the previously received data storage means, wherein the reception means stores the received control data in the received data storage means, the identity judgement means compares a second piece of control data that is stored in the received data storage means with a first piece of control data that is stored in the previously received data storage means, and judges whether the first and second piece of control data are a same piece of control data, the previously received data transfer means transfers a piece of control data from the received data storage means to the previously received data storage means after a judgement by the identity judgement means, and the notification means includes:

an output data storage unit for storing CPU-readable control data that the CPU is notified of;

an interrupt control unit for interrupting the CPU in order to request the CPU to read control data;

an output transfer unit for transferring control data from the received data storage means to the output data storage unit; and an output control unit for giving a transfer instruction to the output transfer unit and instructing the interrupt control unit to interrupt the CPU when receiving an instruction from the notification control means to notify the CPU of control data.

17. The remote control signal reception controller according to claim 16, wherein the notification means further includes:

a CPU notification information storage unit for storing information in advance, the information showing control data of which the CPU should be informed;

a peripheral device access information conversion unit for converting, when finding that the CPU should not be informed of a piece of control data stored in the output data storage unit on referring to the information stored in the CPU notification information storage unit, the piece of control data stored in the output data storage unit into an address corresponding to a peripheral device connected to the remote control signal reception controller and an input data for the peripheral device; and a peripheral device control unit for obtaining an address and an input data using the peripheral device access information conversion unit and controlling a peripheral device, and wherein when finding that the CPU should be notified of the second piece of control data the information of which the notification control means has the notification means notify the CPU on referring to the CPU notification information storage unit, the output control unit instructs the interrupt control unit to inform the CPU of the piece of control data, and when finding that the CPU should not be notified of the second piece of control data, the output control unit has the peripheral device control unit control a peripheral device.

18. A remote control signal reception controller that transmits control data for controlling an operation of a CPU that controls an electric apparatus, wherein the remote control signal reception controller receives the control data from a remote control signal sender, comprising:

reception unit for receiving control data;

an interrupt control unit for notifying the CPU to read the control data;

an output data storage unit for storing the control data to be read by the CPU;

an interval measurement unit for measuring, when the reception means receives a second piece of control data following a first piece of control data, an interval between reception of the first and second piece of control data; and a notification control unit for having the interrupt control unit notify the CPU of information on the second piece of control data when the interval measured by the interval measurement unit is larger than a first value that represents an interval between transmissions of a same piece of control data which is repeatedly transmitted from the same remote control signal sender, and for preventing the interrupt control unit from notifying the CPU of the information on the second piece of control data when the interval measured by the interval measurement unit is equal to or smaller than the first value.

19. A remote control signal reception controller that transmits control data for controlling an operation of a CPU that controls an electric apparatus, wherein the remote control signal reception controller receives the control data from a remote control signal sender, comprising:

reception unit for receiving control data;

an interrupt control unit for notifying the CPU to read the control data;

an output data storage unit for storing the control data to read by the CPU;

an interval measurement unit for measuring, when the reception means receives a second piece of control data following a first piece of control data, an interval between reception of the first and second piece of control data;

a notification control unit for having the interrupt control unit notify the CPU of information on the second piece of control data when the interval measured by the interval measurement unit is larger than a first value that represents an interval between transmissions of a same piece of control data which is repeatedly transmitted from the same remote control signal sender, and for preventing the interrupt control unit from notifying the CPU of the information on the second piece of control data when the interval measured by the interval measurement unit is equal to or small than the first value;

a continuous notification necessity information storage unit for storing information in advance, the information showing when the CPU needs to be informed of information on a piece of control data only when the piece of control data is received N times where N is a number equal to or greater than 2; and a continuous notification necessity judgment unit operatively connected to the continuous notification necessity information storage unit and the notification control unit for determining when the CPU needs to be interrupted to read the piece of control data.

20. A remote control signal reception controller that transmits control data for controlling an operation of a CPU that controls an electric apparatus, wherein the remote control signal reception controller receives the control data from a remote control signal sender, comprising:

reception unit for receiving control data;

an interrupt control unit for notifying the CPU to read the control data;

an output data storage unit for storing the control data to be read by the CPU;

an interval measurement unit for measuring, when the reception means receives a second piece of control data following a first piece of control data, an interval between reception of the first and second piece of control data;

a notification control unit for having the interrupt control unit notify the CPU of information on the second piece of control data when the interval measured by the interval measurement unit is larger than a first value that represents an interval between transmissions of a same piece of control data which is repeatedly transmitted from the same remote control signal sender, and for preventing the interrupt control unit from notifying the CPU of the information on the second piece of control data when the interval measured by the interval measurement unit is equal to or smaller than the first value;

an elapsed time count unit for setting a predetermined time period;

a combination possibility information storage unit for storing possible combination of control data as third pieces of control data;

a combination possibility judgment unit for determining when the first piece of control data and the second piece of control data can be representative of a third piece of control data and storing the third piece of control data; and an output control unit for outputting the third piece of control data when the elapsed time count unit has not reached the predetermined time period upon receipt of the second piece of control data.

* * * * *